(12) United States Patent
Bartlett et al.

(10) Patent No.: US 7,505,823 B1
(45) Date of Patent: Mar. 17, 2009

(54) ACOUSTIC COMMUNICATION SYSTEM

(75) Inventors: David Bartlett, Cambridgeshire (GB); Scott Hommel, Cambridgeshire (GB); Michael Reynolds, Cambridgeshire (GB); David Alexander Butler, Cambridgeshire (GB); Peter John Kelly, Cambridgeshire (GB)

(73) Assignee: Intrasonics Limited, Harston, Cambridge (GB)

( * ) Notice: Subject to any disclaimer, the term of this patent is extended or adjusted under 35 U.S.C. 154(b) by 794 days.

(21) Appl. No.: 09/856,734

(22) PCT Filed: Jul. 31, 2000

(86) PCT No.: PCT/GB00/02961

§ 371 (c)(1),
(2), (4) Date: May 25, 2001

(87) PCT Pub. No.: WO01/10065

PCT Pub. Date: Feb. 8, 2001

(30) Foreign Application Priority Data

Jul. 30, 1999 (GB) ................................. 9917985.5

(51) Int. Cl.
*G06F 17/00* (2006.01)
*A63H 30/00* (2006.01)
(52) U.S. Cl. ....................................... 700/94; 446/175
(58) Field of Classification Search .................... 700/94; 375/146, 150, 238, 141; 446/175, 484
See application file for complete search history.

(56) References Cited

U.S. PATENT DOCUMENTS

| | | | |
|---|---|---|---|
| 2,660,662 A | 11/1953 | Scherbatskoy | ................. 250/2 |
| 3,651,471 A | 3/1972 | Haselwood et al. | ...... 340/172.5 |
| 3,732,536 A | 5/1973 | Larka et al. | |
| 3,742,463 A | 6/1973 | Haselwood et al. | ...... 340/172.5 |
| 3,845,391 A | 10/1974 | Crosby | ........................ 325/64 |

(Continued)

FOREIGN PATENT DOCUMENTS

CA  2129925  2/1996

(Continued)

OTHER PUBLICATIONS

Techniques for data hiding (IBM Systems Journal, vol. 35, Nos. 3 &4) 1996.*

(Continued)

*Primary Examiner*—Suhan Ni
*Assistant Examiner*—Andrew C Flanders
(74) *Attorney, Agent, or Firm*—Alston & Bird LLP

(57) ABSTRACT

A signalling system is provided which can be used to update the prices of goods which are electronically displayed on supermarket shelves (1). The signalling system comprises a first signalling device having an input terminal for receiving electrical message data received from a central computer system (5), a spread spectrum encoder for encoding the received message data and an electroacoustic converter (11) for converting the encoded data into corresponding acoustic signals and for transmitting the acoustic signals into a transmission medium. The signalling system also comprises a second signalling device (3) having means for receiving acoustic signals from said transmission medium and for converting the received acoustic signals into corresponding electrical signals, a spread spectrum decoder for decoding the received signals and a message regenerator for regenerating the message data transmitted by the first signalling device from the signals output by the decoder.

57 Claims, 24 Drawing Sheets

U.S. PATENT DOCUMENTS

| | | | |
|---|---|---|---|
| 4,025,851 A | 5/1977 | Haselwood et al. ............ 325/31 |
| 4,237,449 A | 12/1980 | Zibell ......................... 340/407 |
| 4,425,642 A | 1/1984 | Moses et al. |
| 4,514,725 A | 4/1985 | Bristley ....................... 340/691 |
| 4,642,685 A | 2/1987 | Roberts et al. ................ 358/84 |
| 4,718,106 A | 1/1988 | Weinblatt ..................... 455/2 |
| 4,750,034 A | 6/1988 | Lem ............................ 358/84 |
| 4,807,031 A | 2/1989 | Broughton et al. .......... 358/142 |
| 4,840,602 A * | 6/1989 | Rose ........................... 446/175 |
| 4,846,693 A | 7/1989 | Baer ........................... 434/308 |
| 4,923,428 A | 5/1990 | Curran ........................ 446/175 |
| 4,945,412 A | 7/1990 | Kramer ....................... 358/142 |
| 5,085,610 A | 2/1992 | Engel et al. |
| 5,090,936 A * | 2/1992 | Satoh et al. ................ 446/175 |
| 5,108,341 A | 4/1992 | DeSmet ....................... 446/299 |
| 5,113,437 A | 5/1992 | Best et al. ..................... 380/3 |
| 5,136,613 A | 8/1992 | Dumestre, III ................. 375/1 |
| 5,191,615 A * | 3/1993 | Aldava et al. .................. 381/2 |
| 5,301,167 A | 4/1994 | Proakis et al. |
| 5,305,348 A | 4/1994 | Izumi |
| 5,314,336 A * | 5/1994 | Diamond et al. ............. 434/169 |
| 5,319,735 A | 6/1994 | Preuss et al. |
| 5,353,352 A | 10/1994 | Dent et al. |
| 5,412,620 A | 5/1995 | Cafarella et al. ............ 367/134 |
| 5,436,941 A | 7/1995 | Dixon et al. ................. 375/206 |
| 5,442,343 A | 8/1995 | Cato et al. |
| 5,446,756 A | 8/1995 | Mallinckrodt |
| 5,450,490 A | 9/1995 | Jensen et al. .................... 380/6 |
| 5,479,442 A | 12/1995 | Yamamoto ................... 375/206 |
| 5,499,265 A | 3/1996 | Dixon et al. ................. 375/200 |
| 5,519,779 A | 5/1996 | Proctor et al. |
| 5,539,705 A | 7/1996 | Akerman et al. ............. 367/132 |
| 5,555,258 A | 9/1996 | Snelling et al. |
| 5,574,773 A | 11/1996 | Grob et al. |
| 5,579,124 A | 11/1996 | Aijala et al. ................... 386/96 |
| 5,604,767 A | 2/1997 | Dixon et al. |
| 5,657,379 A | 8/1997 | Honda et al. |
| 5,663,766 A | 9/1997 | Sizer, II |
| 5,687,191 A | 11/1997 | Lee et al. ..................... 375/216 |
| 5,719,937 A | 2/1998 | Warren et al. ................... 380/4 |
| 5,734,639 A | 3/1998 | Bustamante et al. |
| 5,752,880 A | 5/1998 | Gabai et al. |
| 5,774,452 A | 6/1998 | Wolosewicz ................. 370/212 |
| 5,822,360 A | 10/1998 | Lee et al. |
| 5,828,325 A | 10/1998 | Wolosewicz et al. .......... 341/52 |
| 5,848,155 A | 12/1998 | Cox ................................. 380/4 |
| 5,918,223 A | 6/1999 | Blum et al. |
| 5,930,369 A | 7/1999 | Cox et al. ...................... 380/54 |
| 5,937,000 A * | 8/1999 | Lee et al. ..................... 375/141 |
| 5,945,932 A | 8/1999 | Smith et al. |
| 5,960,398 A | 9/1999 | Fuchigami et al. ........... 704/270 |
| 5,963,909 A | 10/1999 | Warren et al. ................... 705/1 |
| 5,978,413 A | 11/1999 | Bender |
| 5,999,899 A | 12/1999 | Robinson |
| 6,021,432 A | 2/2000 | Sizer, II et al. |
| 6,022,273 A | 2/2000 | Gabai et al. |
| 6,035,177 A | 3/2000 | Moses et al. |
| 6,061,793 A | 5/2000 | Tewfik et al. |
| 6,125,172 A | 9/2000 | August et al. |
| 6,290,566 B1 * | 9/2001 | Gabai et al. ................. 446/175 |
| 6,298,322 B1 | 10/2001 | Lindemann |
| 6,309,275 B1 | 10/2001 | Fong et al. |
| 6,370,666 B1 * | 4/2002 | Lou et al. ..................... 714/751 |
| 6,389,055 B1 * | 5/2002 | August et al. ............... 375/130 |
| 6,434,253 B1 | 8/2002 | Hayashi et al. |
| 6,438,117 B1 | 8/2002 | Grilli et al. |
| 6,442,283 B1 | 8/2002 | Tewfik et al. |
| 6,584,138 B1 * | 6/2003 | Neubauer et al. ........... 375/130 |
| 6,636,551 B1 * | 10/2003 | Ikeda et al. ................. 375/130 |
| 6,650,877 B1 | 11/2003 | Tarbouriech et al. |
| 6,708,214 B1 | 3/2004 | La Fleur |
| 6,737,957 B1 * | 5/2004 | Petrovic et al. ............. 340/5.86 |
| 6,765,950 B1 * | 7/2004 | Nuytkens et al. ............ 375/130 |
| 6,773,344 B1 * | 8/2004 | Gabai et al. ..................... 463/1 |
| 6,782,253 B1 | 8/2004 | Shteyn et al. |
| 6,832,093 B1 | 12/2004 | Ranta |
| 6,850,555 B1 * | 2/2005 | Barclay ....................... 375/141 |
| 6,876,623 B1 * | 4/2005 | Lou et al. ..................... 370/208 |
| 6,892,175 B1 | 5/2005 | Cheng et al. |
| 7,031,271 B1 | 4/2006 | LaRosa et al. |
| 7,158,676 B1 | 1/2007 | Rainsford |
| 2001/0030710 A1 | 10/2001 | Werner |
| 2002/0069263 A1 | 6/2002 | Sears et al. |
| 2004/0169581 A1 * | 9/2004 | Petrovic et al. ............... 340/5.2 |

FOREIGN PATENT DOCUMENTS

| | | |
|---|---|---|
| DE | 32 29 405 A1 | 2/1984 |
| EP | 0 135 192 | 3/1985 |
| EP | 0 172 095 | 2/1986 |
| EP | 0347 401 A3 | 12/1989 |
| EP | 0 606 703 B1 | 7/1994 |
| EP | 0631 226 A1 | 12/1994 |
| EP | 0 766 468 A2 | 4/1997 |
| EP | 0 822 550 A1 | 2/1998 |
| EP | 0 828 372 A2 | 3/1998 |
| EP | 0863 631 A2 | 9/1998 |
| EP | 0 674 405 B1 | 10/1998 |
| EP | 0 872 995 A2 | 10/1998 |
| EP | 0872995 | 10/1998 |
| EP | 1 158 800 A1 | 11/2001 |
| FR | 2 626 731 | 8/1989 |
| GB | 2 135 536 A | 8/1984 |
| GB | 2 192 743 A | 1/1988 |
| GB | 2 196 167 A | 4/1988 |
| GB | 2 256 113 A | 11/1992 |
| GB | 2 294 619 A | 5/1996 |
| GB | 2 334 133 A | 8/1999 |
| GB | EP 0875107 | 9/1999 |
| GB | 2 343 774 A | 5/2000 |
| GB | 2 345 779 A | 7/2000 |
| JP | 58-69536 A | 4/1958 |
| JP | 63-147738 U | 9/1963 |
| JP | 59-166545 U | 11/1984 |
| JP | 63-272134 A | 11/1988 |
| JP | 04-092518 | 3/1992 |
| JP | 5252578 A | 9/1993 |
| JP | 05-316598 | 11/1993 |
| JP | 10-021259 | 1/1998 |
| JP | 2000 152217 | 5/2000 |
| JP | 2000-207170 | 7/2000 |
| JP | 2000-236576 | 8/2000 |
| JP | 2000-267952 | 9/2000 |
| JP | 2000-308130 | 11/2000 |
| WO | WO 91/10490 | 7/1991 |
| WO | WO 91/10491 | 7/1991 |
| WO | WO 93/07689 | 4/1993 |
| WO | WO 94/08677 | 4/1994 |
| WO | WO 96/19274 | 6/1995 |
| WO | WO 97/21279 | 6/1997 |
| WO | WO 97/31440 | 8/1997 |
| WO | WO 97/33391 | 9/1997 |
| WO | WO 9733391 A1 * | 9/1997 |
| WO | WO 97/41936 | 11/1997 |
| WO | WO 98/20411 | 5/1998 |
| WO | WO98/32248 | 7/1998 |
| WO | WO 98/51077 | 11/1998 |
| WO | WO 99/00979 | 1/1999 |
| WO | WO 99/46720 | 9/1999 |
| WO | WO 00/15316 | 3/2000 |
| WO | WO 00/44168 A1 | 7/2000 |
| WO | WO 00/60484 | 10/2000 |
| WO | WO 01/57619 | 8/2001 |

| WO | WO 01/75629 | 10/2001 |

OTHER PUBLICATIONS

Micrsoft Computer Dictionary definition of the term Modulate.*

*Information Procesing Society of Japan*, "Digital Watermark Scheme for High Quality Audio Data by Spectrum Spreading and Modified Discrete Cosine Transform", M. Iwakiri et al., vol. 39, No. 9, Sep. 1998, pp. 2631-2637. (English Abstract).

*IEEE Transactions on Consumer Electronics*, "Digital Watermarking for Copyright Protection of MPEG2 Compressed Video", Tae-Yun Chung et al., vol. 44, No. 3, Aug. 1998, pp. 895-901.

*Lecture Notes in Computer Science 1525, Information Hiding*, "Continuous Steganographic Data Transmission Using Uncompressed Audio", Chr. Neubauer et al., 2nd International Workshop, IH '98, Portland, Oregon, USA, Apr. 1998 Proceedings, pp. 208-217.

*IEEE Transactions on Image Processing*, "Secure Spread Spectrum Watermarking for Multimedia", I. J. Cox, et al., vol. 6, No. 12, Dec. 1997, pp. 1673-1687.

*1997 IEEE 6th* International Conference on Universal Personal Communications Record, "An Embedded Cryptosystem for Digital Broadcasting", G.S. Sundaram et al., vol. 2 of 2, Oct. 12 to 16, 1997, San Diego, CA, pp. 401-405.

*International Conference on Image Processing*, "Secure Spread Spectrum Watermarking for Images, Audio and Video", I.J. Cox, et al.., vol. III of III, Sep. 16-19, 1996, Lausanne, Switzerland.

*IBM Systems Journal, MIT Media Lab*, "Techniques for Data Hiding", W. Bender et al., vol. 35, Nos. 3 & 4, 1995, pp. 313-336.

*Lecture Notes in Computer Science 1174, Information Hiding*, "A Secure, Robust Watermark for Multimedia", I.J. Cox, et al., 1st International Workshop Cambridge, U.K., May/Jun. 1996 Proceedings, pp. 185-206.

*SouthCon 96, Conference Record*, "Orlando, Florida, Jun. 25-27, 1996", A Secure, Imperceptible Yet Perceptually Salient, Spread Spectrum Watermark for Multimedia, I.J. Cox, et al., pp. 192-197.

*Principles of Digital Audio*, Second Edition, "Fundamentals of Digital Audio" pp. 47-48 and "Digital Audio Tape (DAT)", pp. 255-256 and "The Compact Disc", p. 323, K..C. Pohlmann.

Swanson et al. "Robust Audio Watermarking Using Perceptual Masking." Elsevier Signal Processing, vol. 66, No. 3, May 1998, pp. 337-355.

Seok et al. "Prediction-Based Audio Watermark Detection Algorithm." 109th AES Convention, Sep. 22-25, 2000, pp. 1-11.

*Simultaneous Subliminal Signalling in Conventional Sound Circuits: A Feasibility Study*, BBC and the ITA, Research Department Report No. 1971/1, Jan. 1971, pp. 1-12.

* cited by examiner

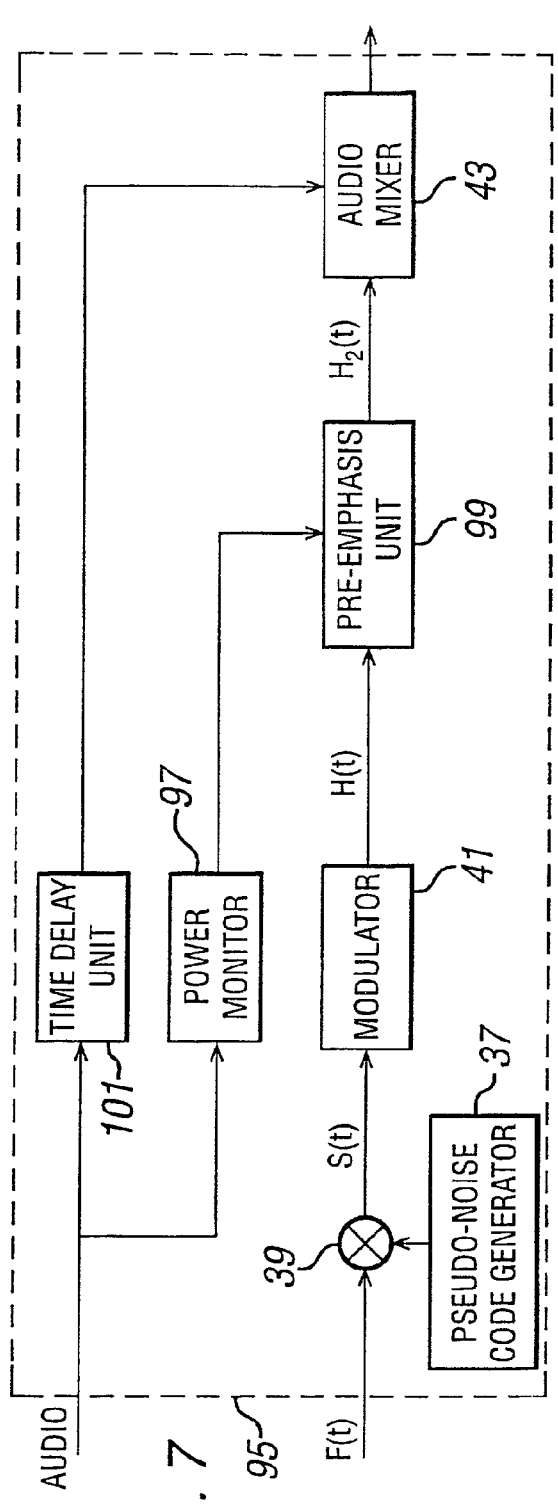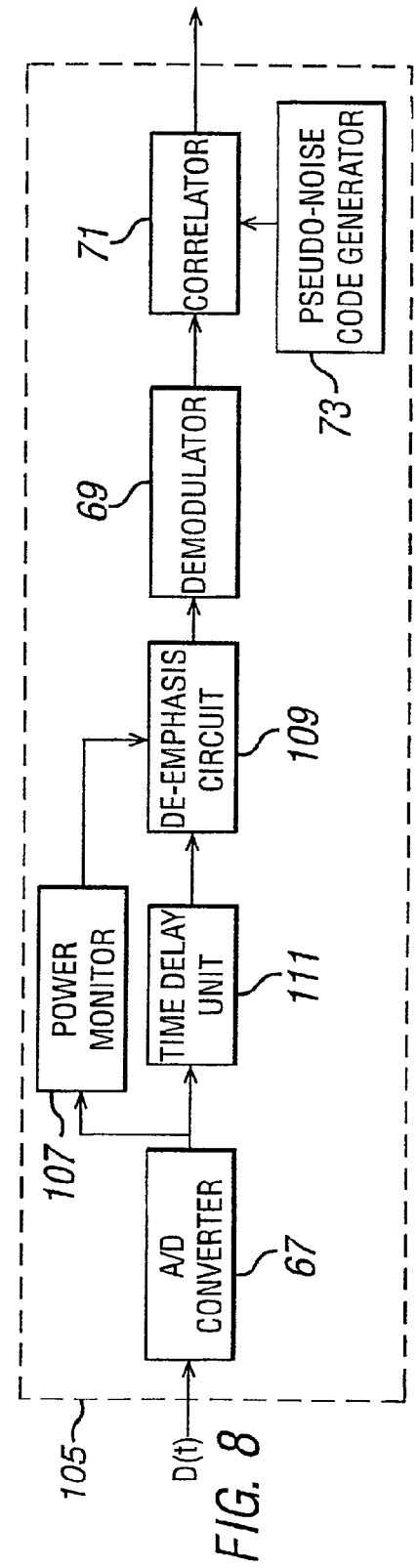

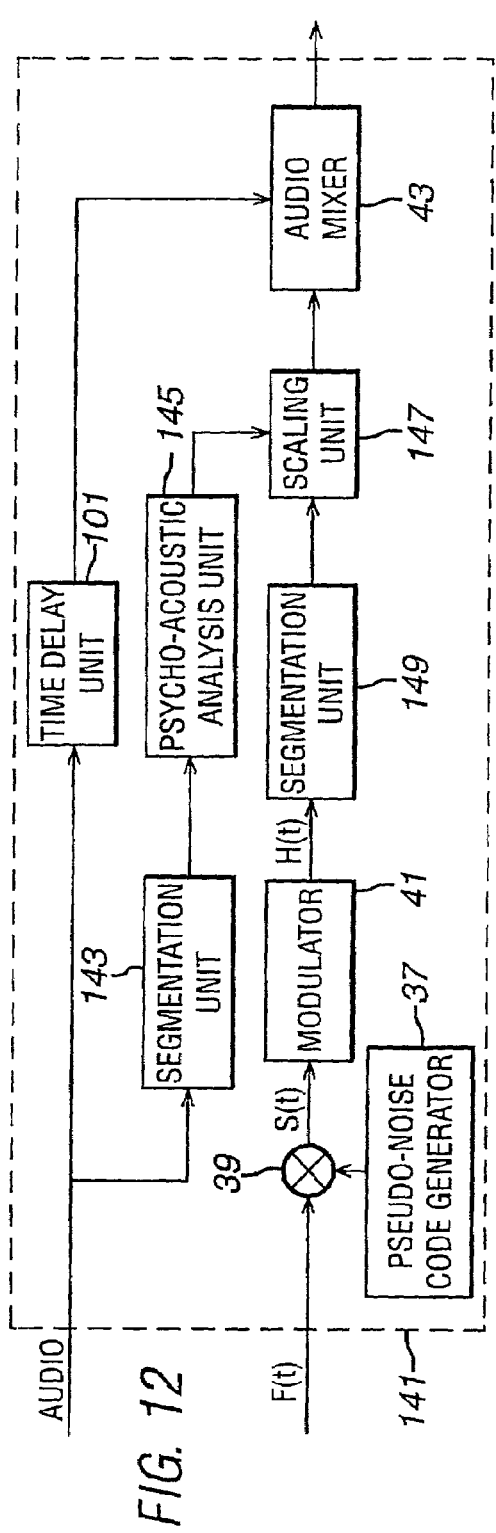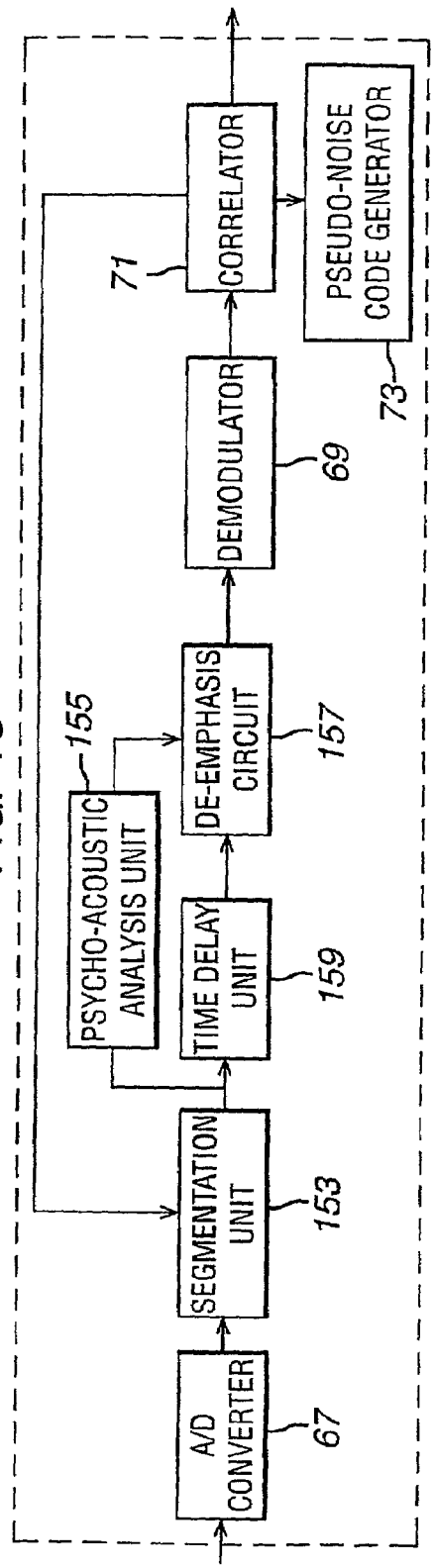

ACOUSTIC COMMUNICATION SYSTEM

This invention relates to an acoustic communication system in which data is transmitted in an audio signal output by a loudspeaker. The invention has particular, but not exclusive, relevance to an electronic toy which detects an audio signal with an electroacoustic transducer and reacts in accordance with data conveyed by the audio signal.

Articles which react to sound are known. For example, room lights are available which turn on or off in response to the sound of hands clapping. However, the complexity of these articles has generally been limited to a single form of reaction in response to a specific sound.

It is an object of the present invention to generate electronic technology which can be incorporated in articles to enable the articles to respond to sound in many different ways depending on the content of the sound.

According to an aspect of the invention, there is provided a toy system in which a data signal is encoded using spread spectrum technology to form a spread signal and the spread signal is transmitted to a toy as an acoustic signal. The toy has an electroacoustic transducer for converting the acoustic signal into an electrical signal which is then despread in order to regenerate the data signal, and the toy responds to the data signal. By using spread spectrum technology to spread the data signal over a wide frequency range, the spread signal in the acoustic signal can be made virtually inaudible to a listener.

Preferably, the spread signal is combined with an audio track to form a modified audio track. The modified audio track is then transmitted as the acoustic signal to the toy. By combining the spread signal with an audio track, the spread signal can be made less noticeable to a listener.

Exemplary embodiments of the invention will now be described with reference to the accompanying drawings, in which:

FIG. 1 schematically shows a signalling system for communicating data between a television studio and an interactive toy located in a house via the audio track of a television signal;

FIG. 2 schematically shows an encoder system for mixing data from a data source with the audio track of a television signal for use in the signalling system described with reference to FIG. 1;

Figure 2:
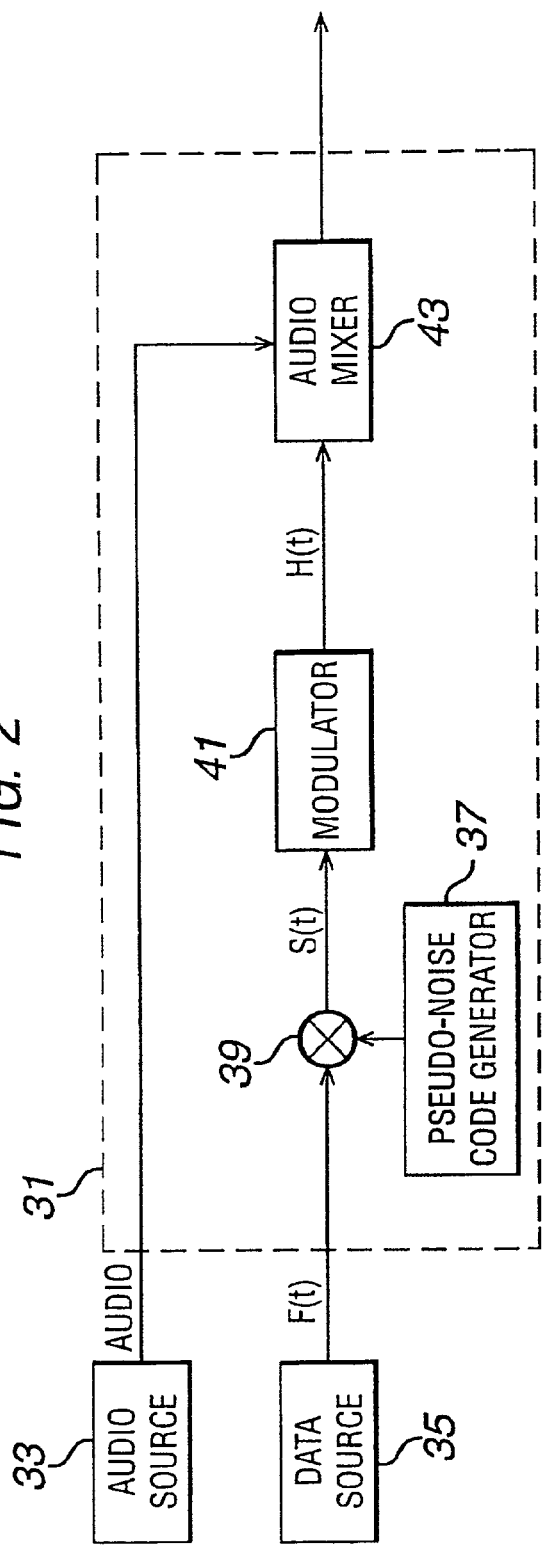
Figure 4:
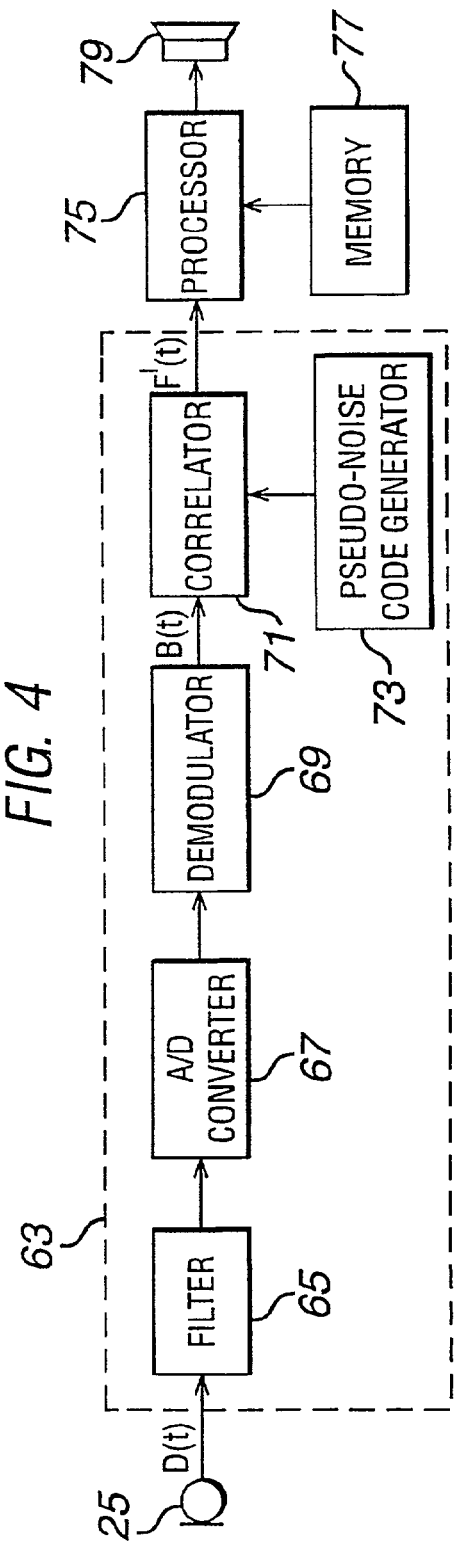
FIG. 4 shows in more detail decoding circuitry in the toy of the signalling system described with reference to FIG. 1.
Figure 5:
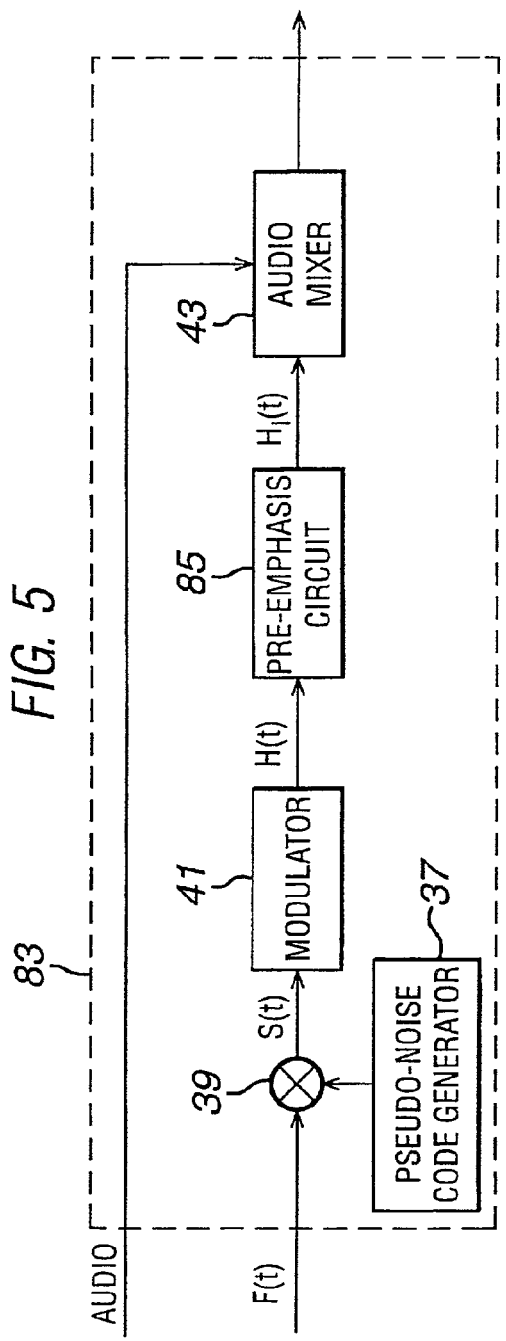
Figure 6:
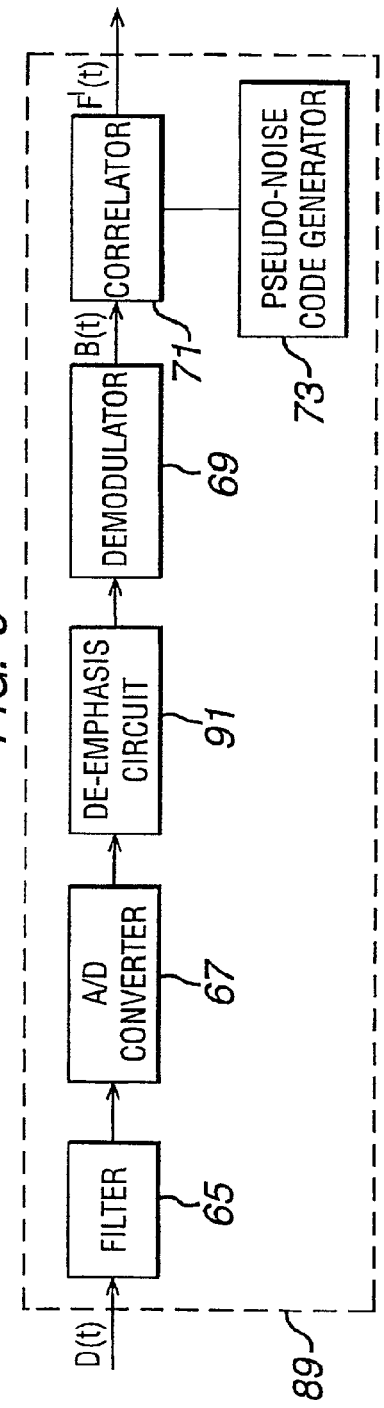
Figure 9:
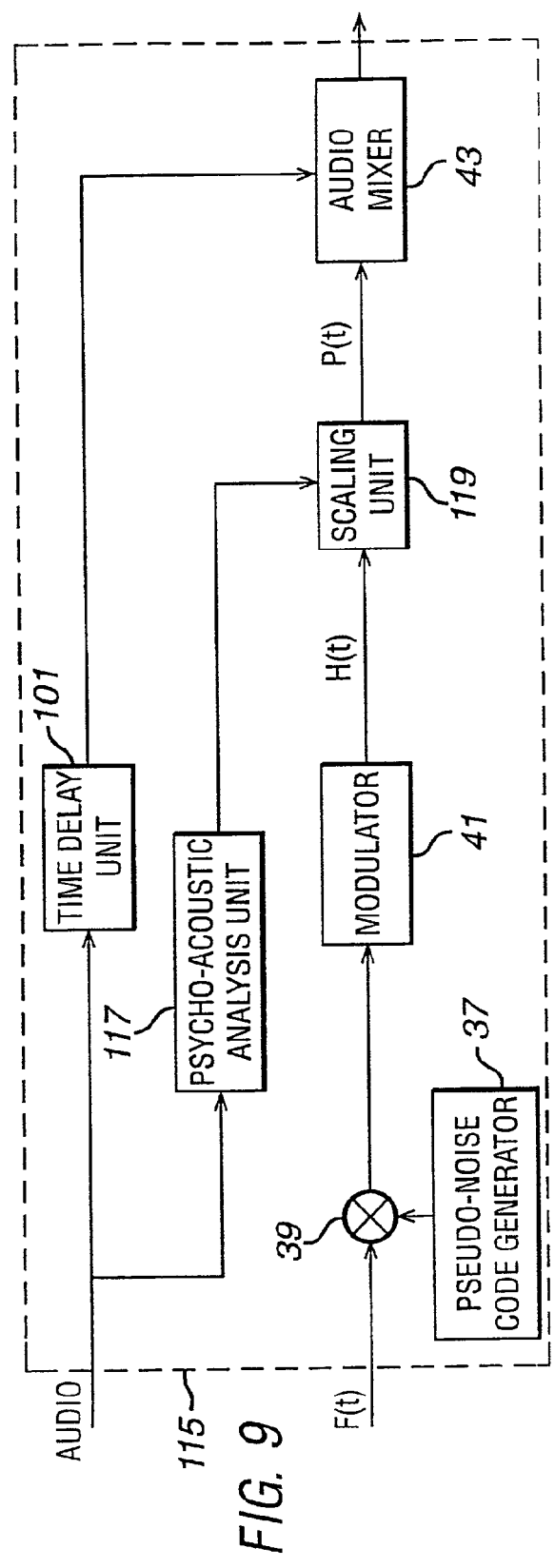
Figure 11:
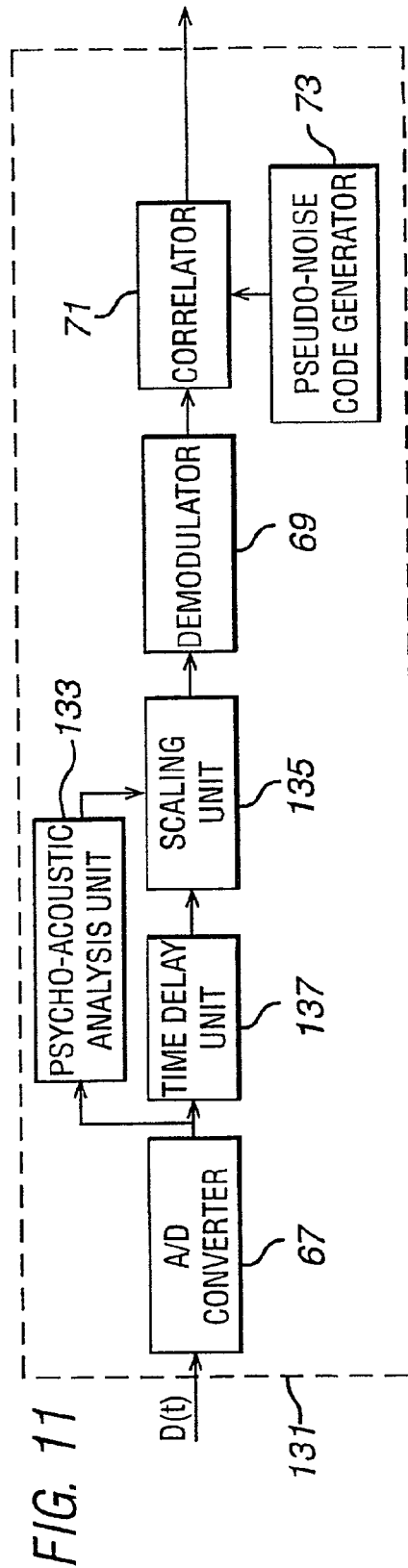
Figure 10:
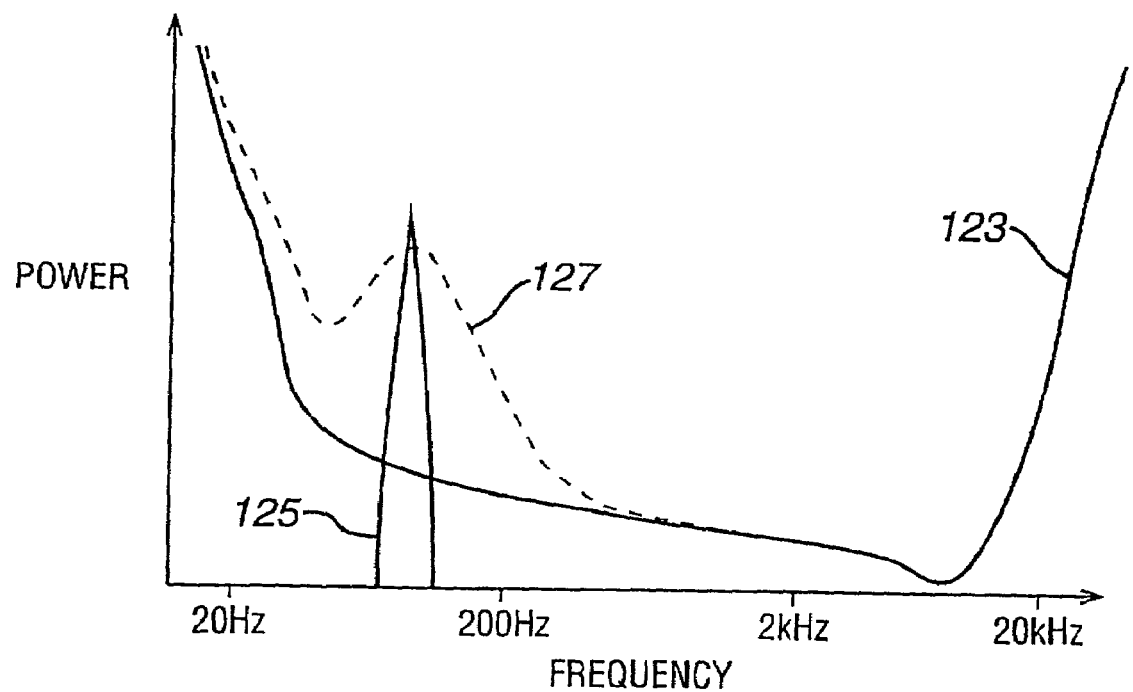
Figure 14:
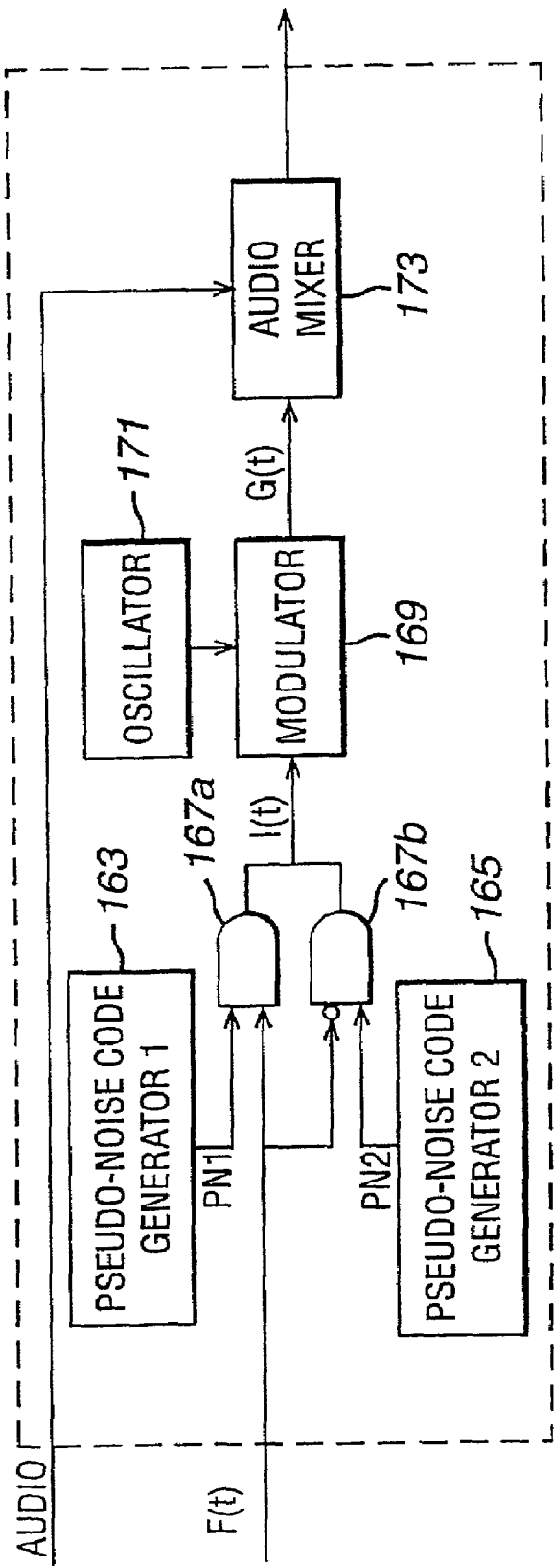
Figure 15A:
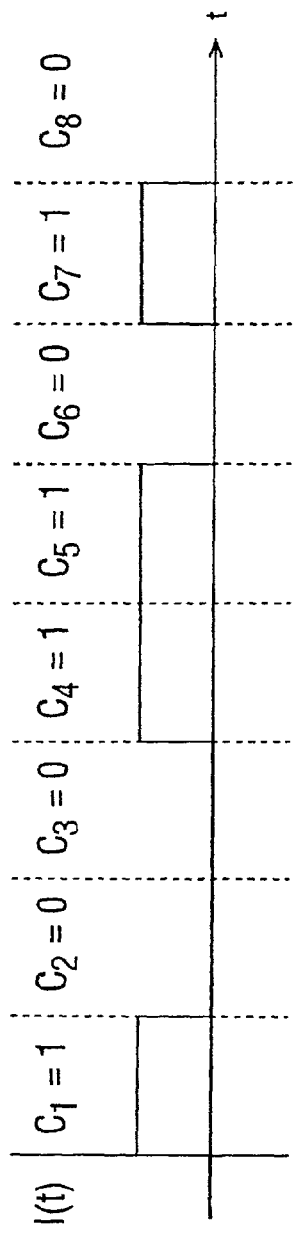
Figure 15B:
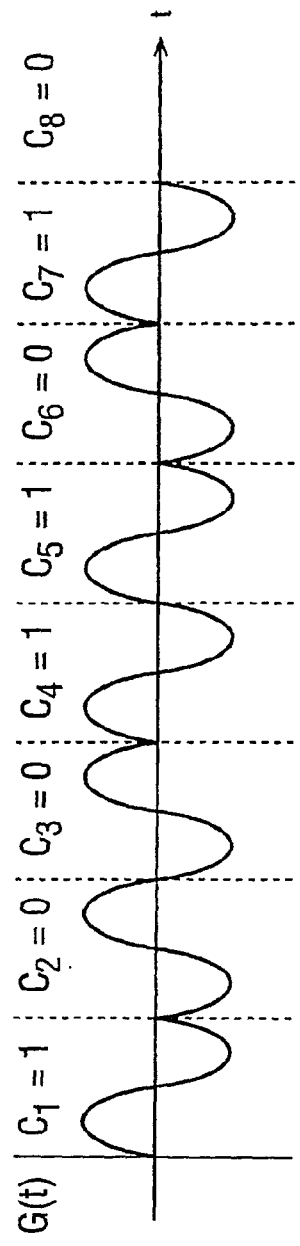
Figure 15C:
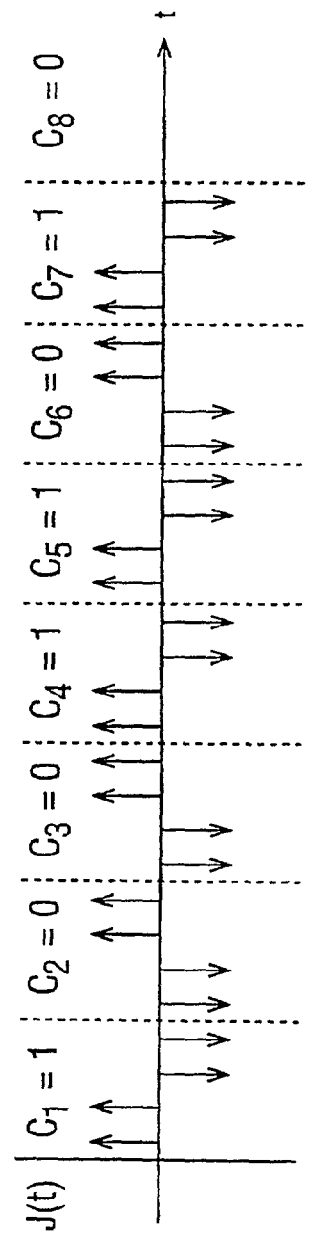
Figure 16:
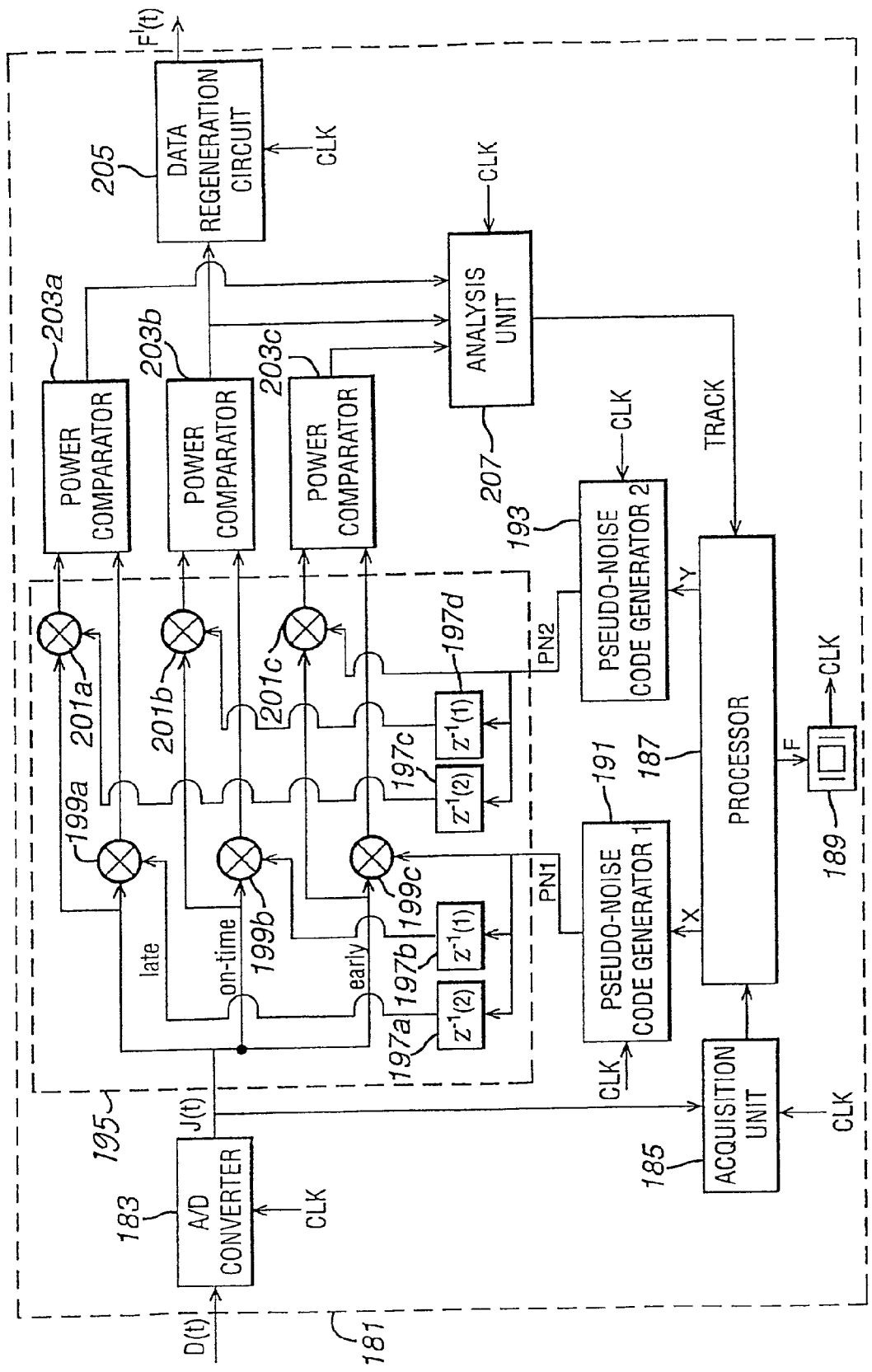
Figure 17:
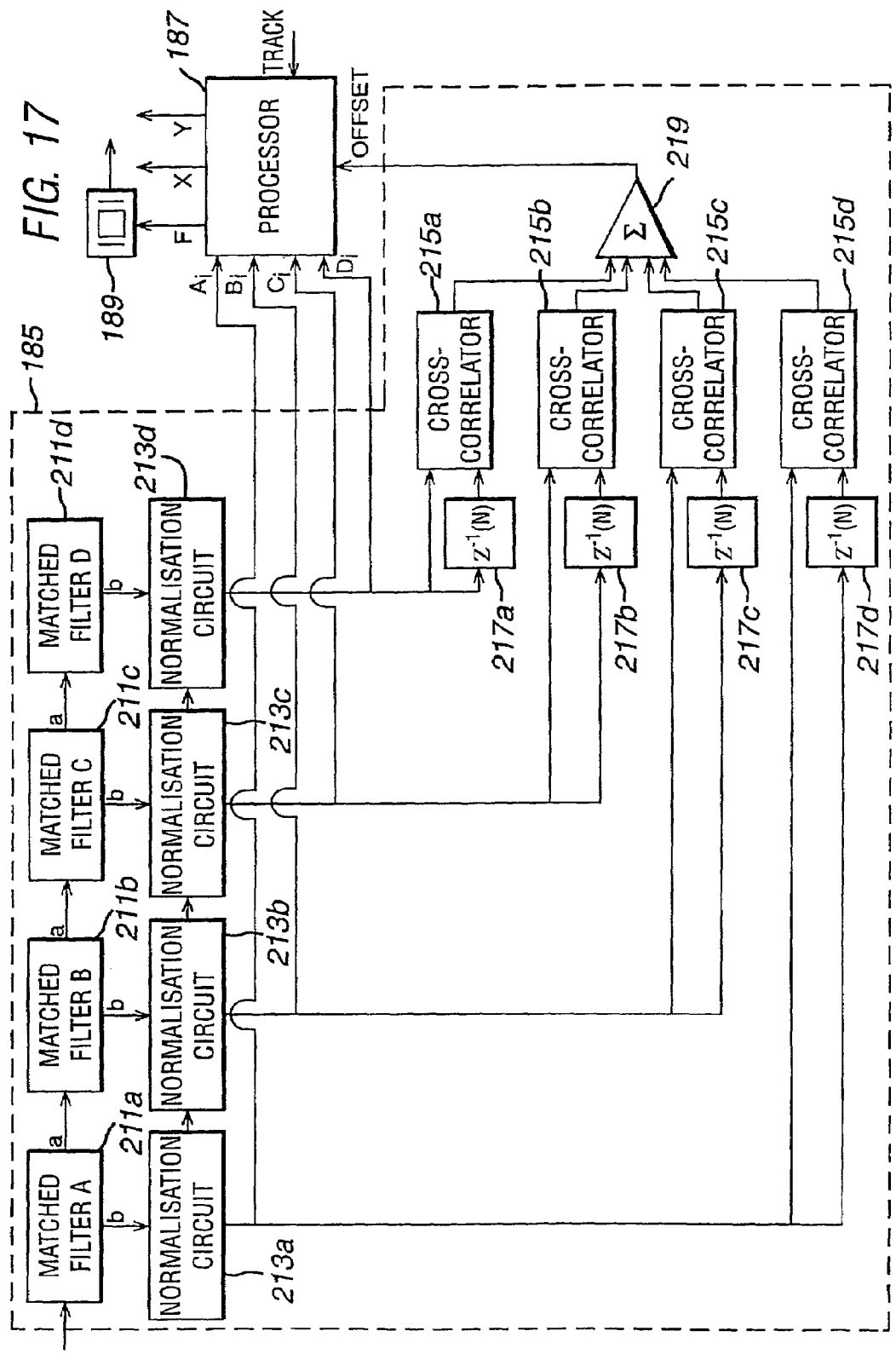
Figure 18:
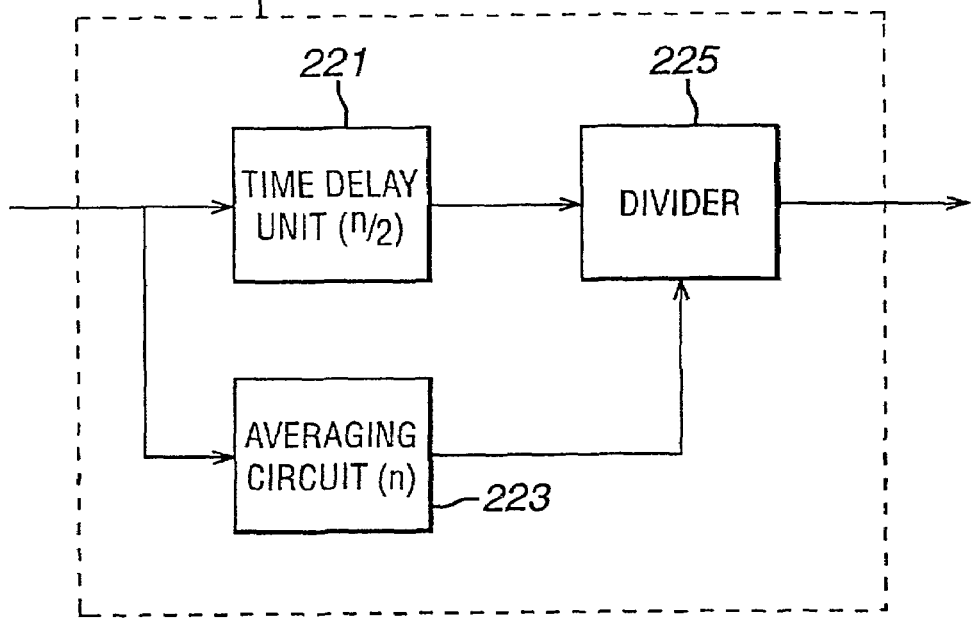
Figure 19:
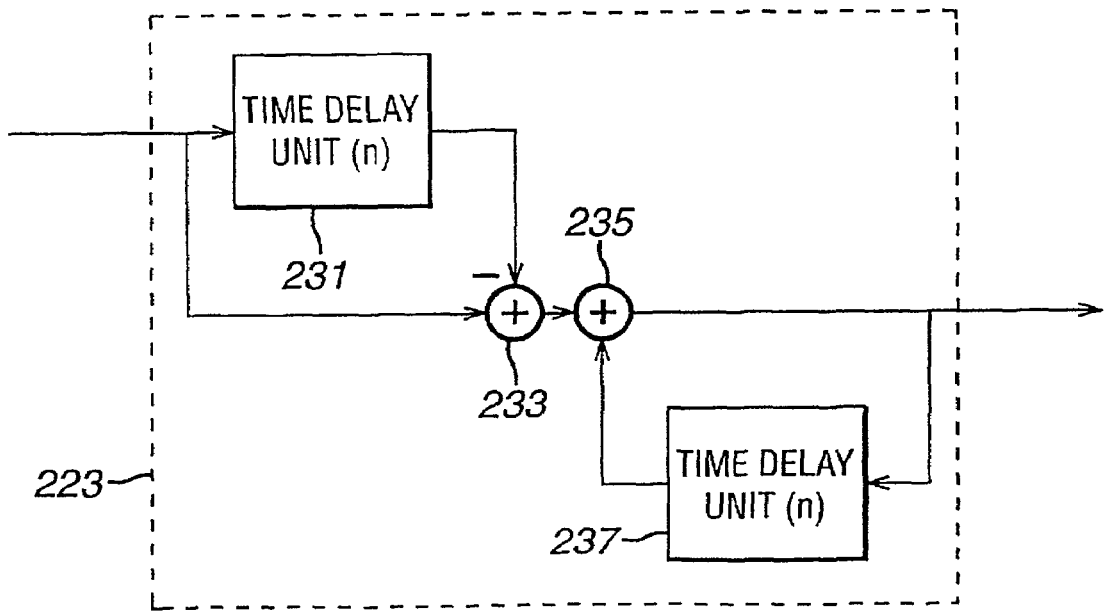
Figure 20:
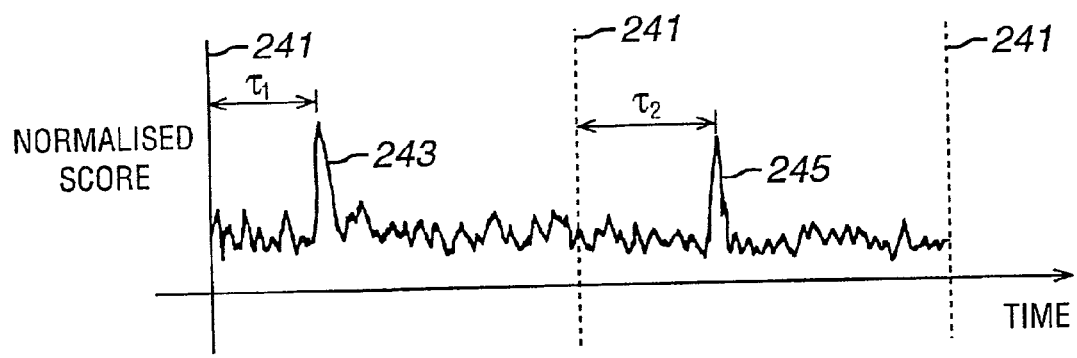
Figure 21:
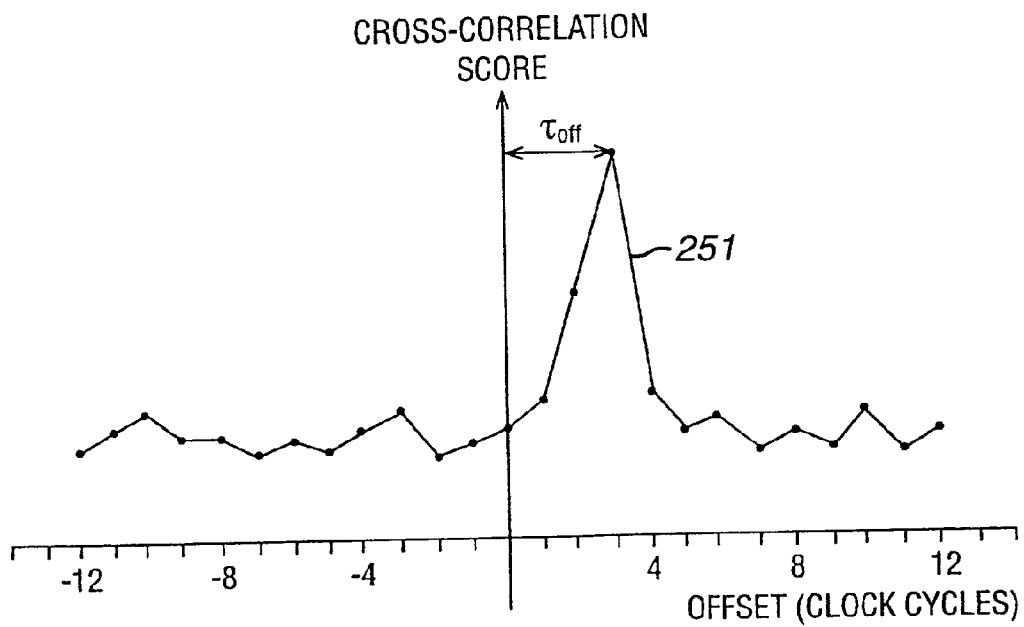
Figure 22:
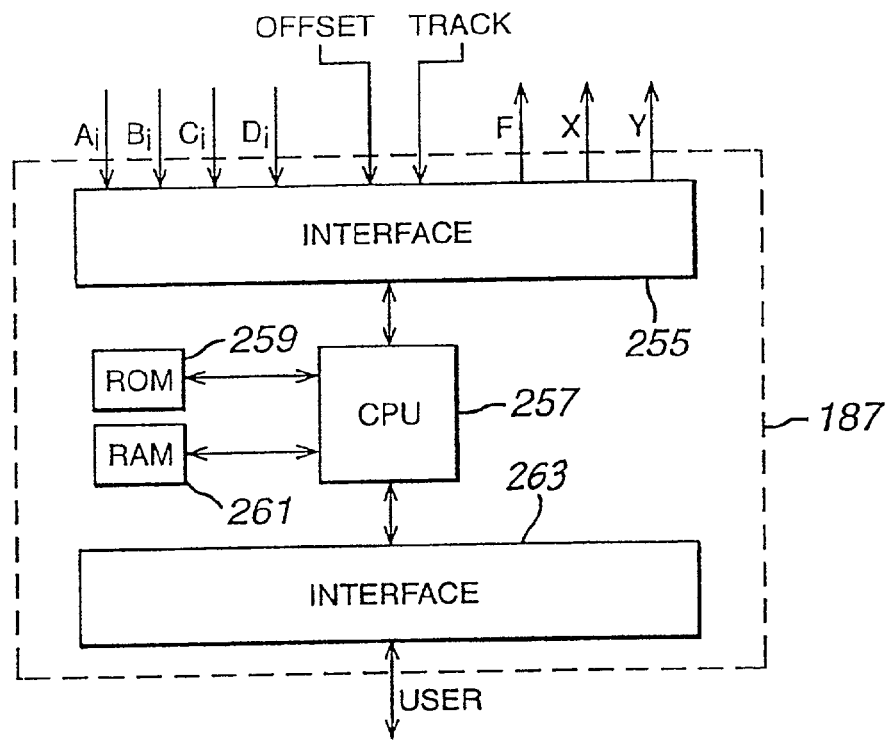
Figure 23:
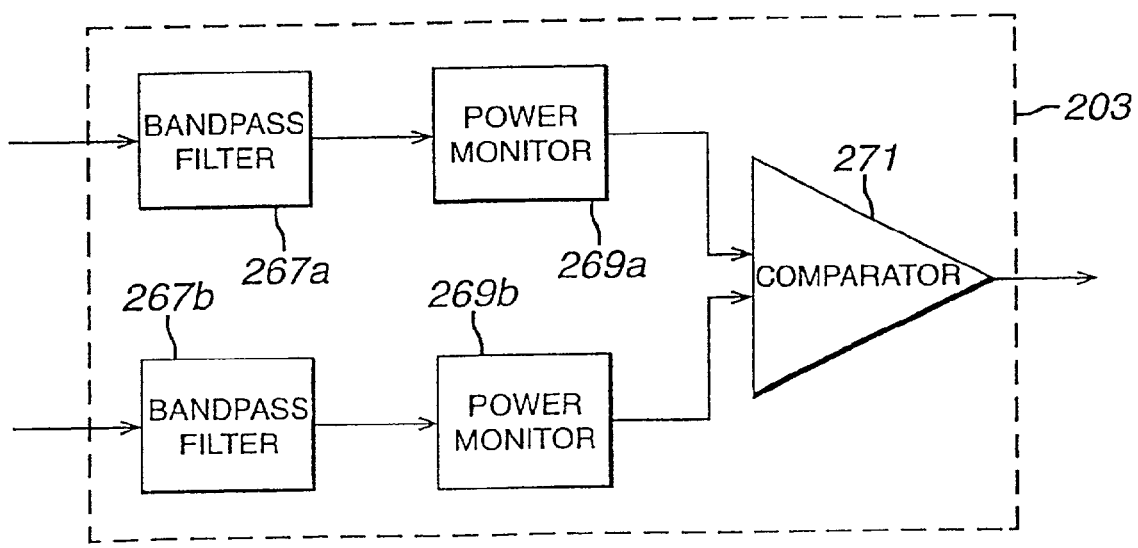
Figure 24:
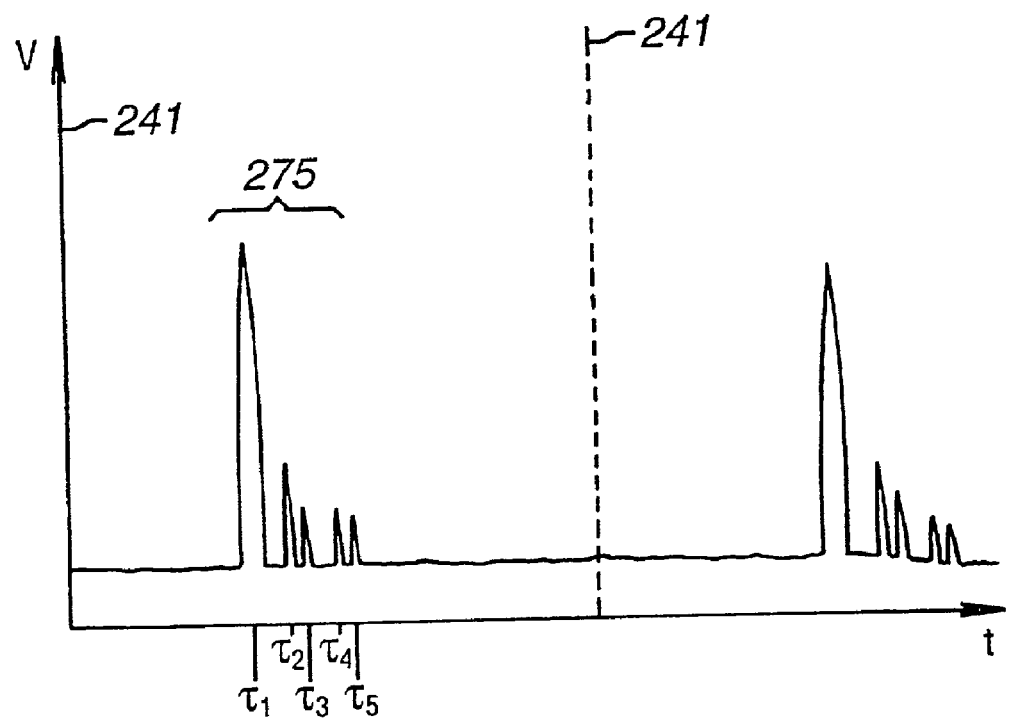
Figure 25:
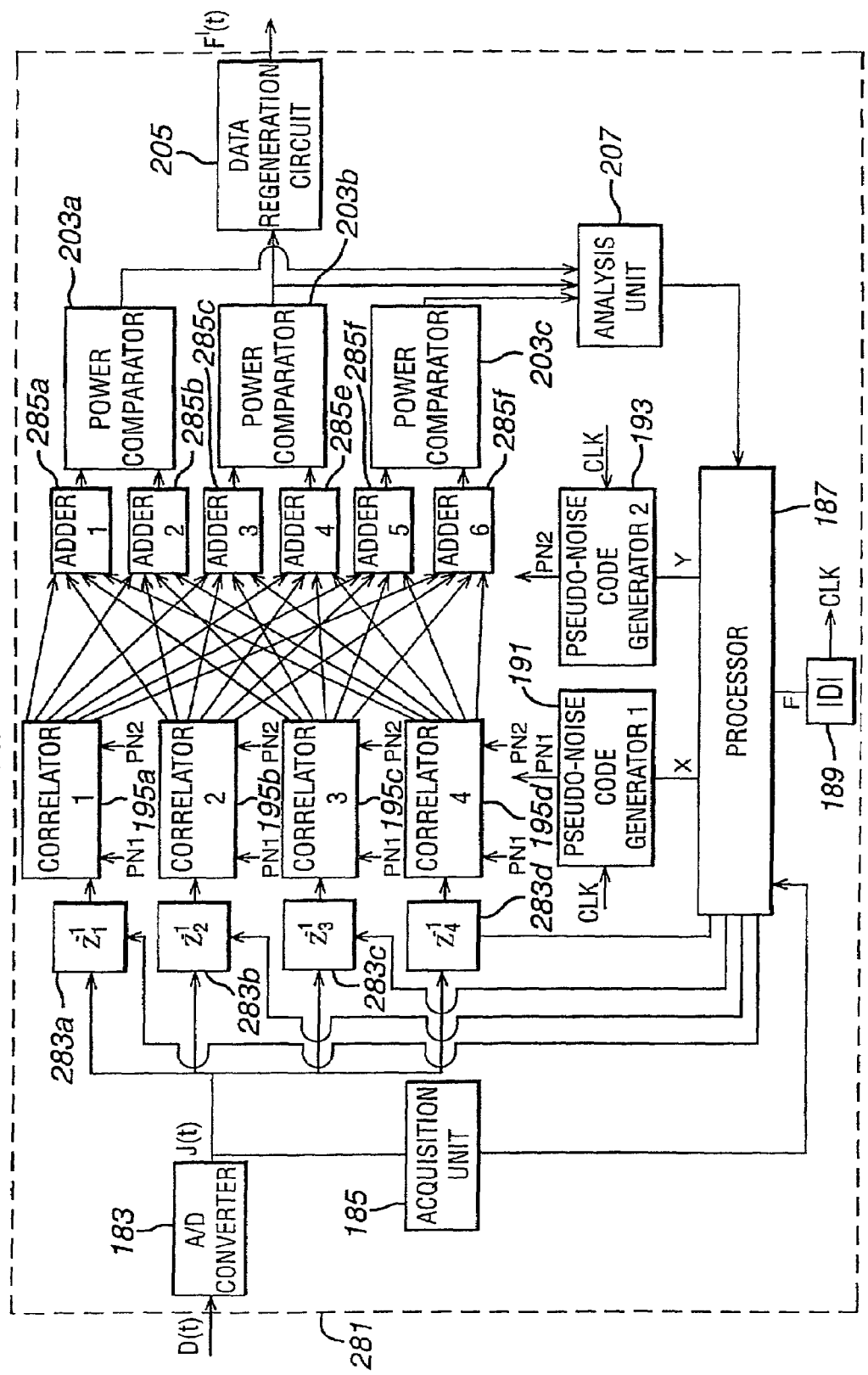
Figure 26:
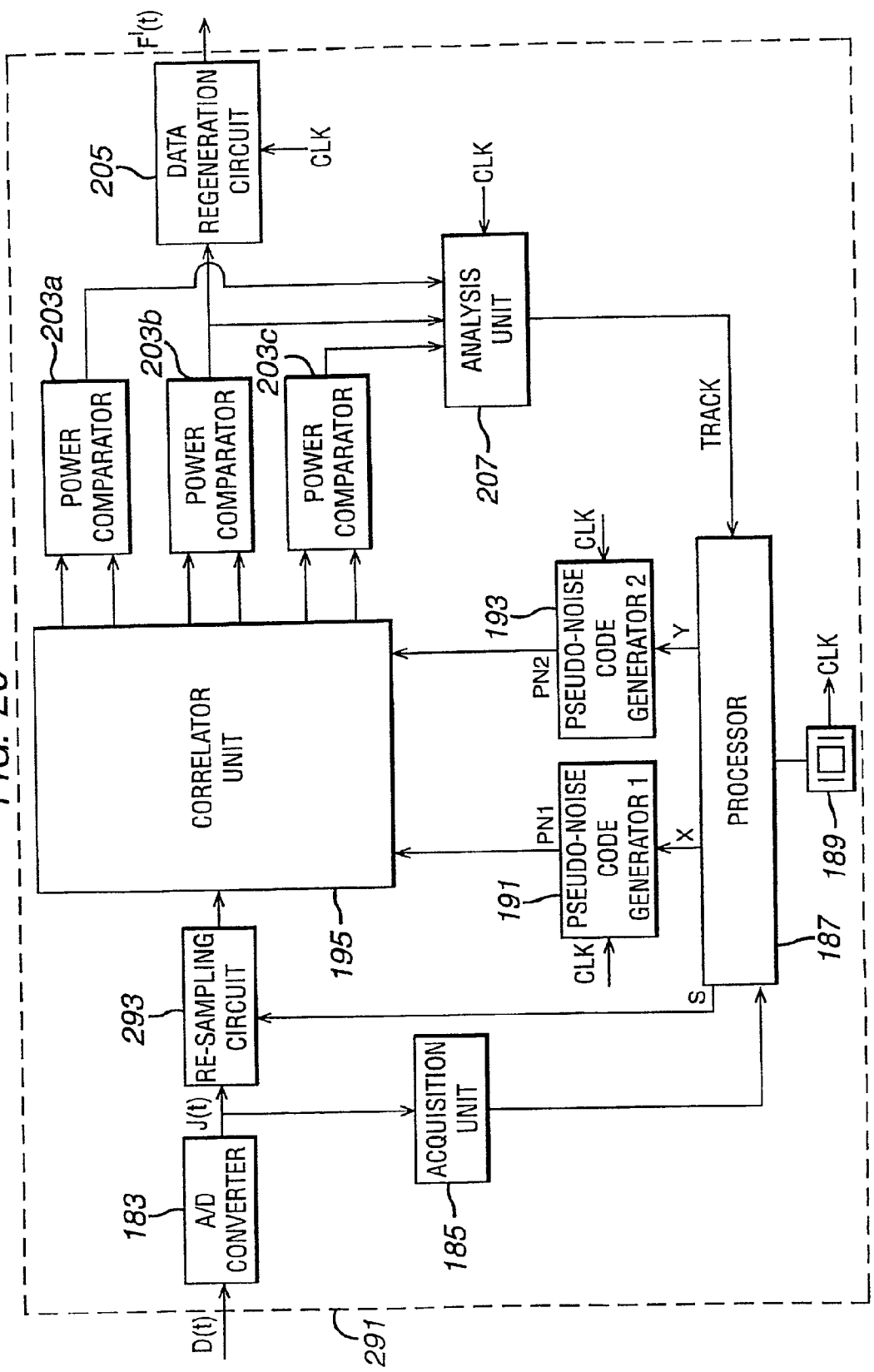
Figure 27:
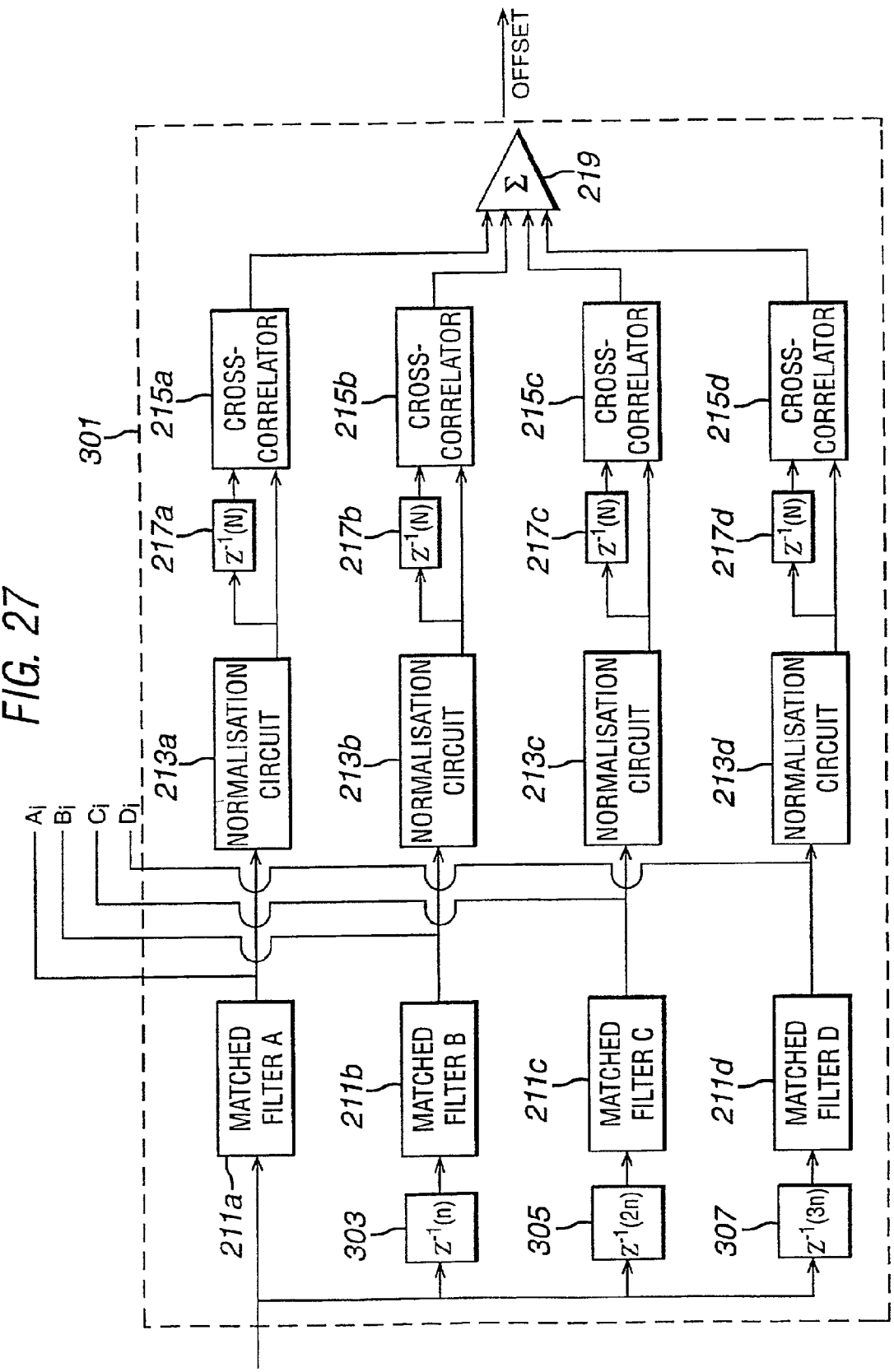
Figure 28:
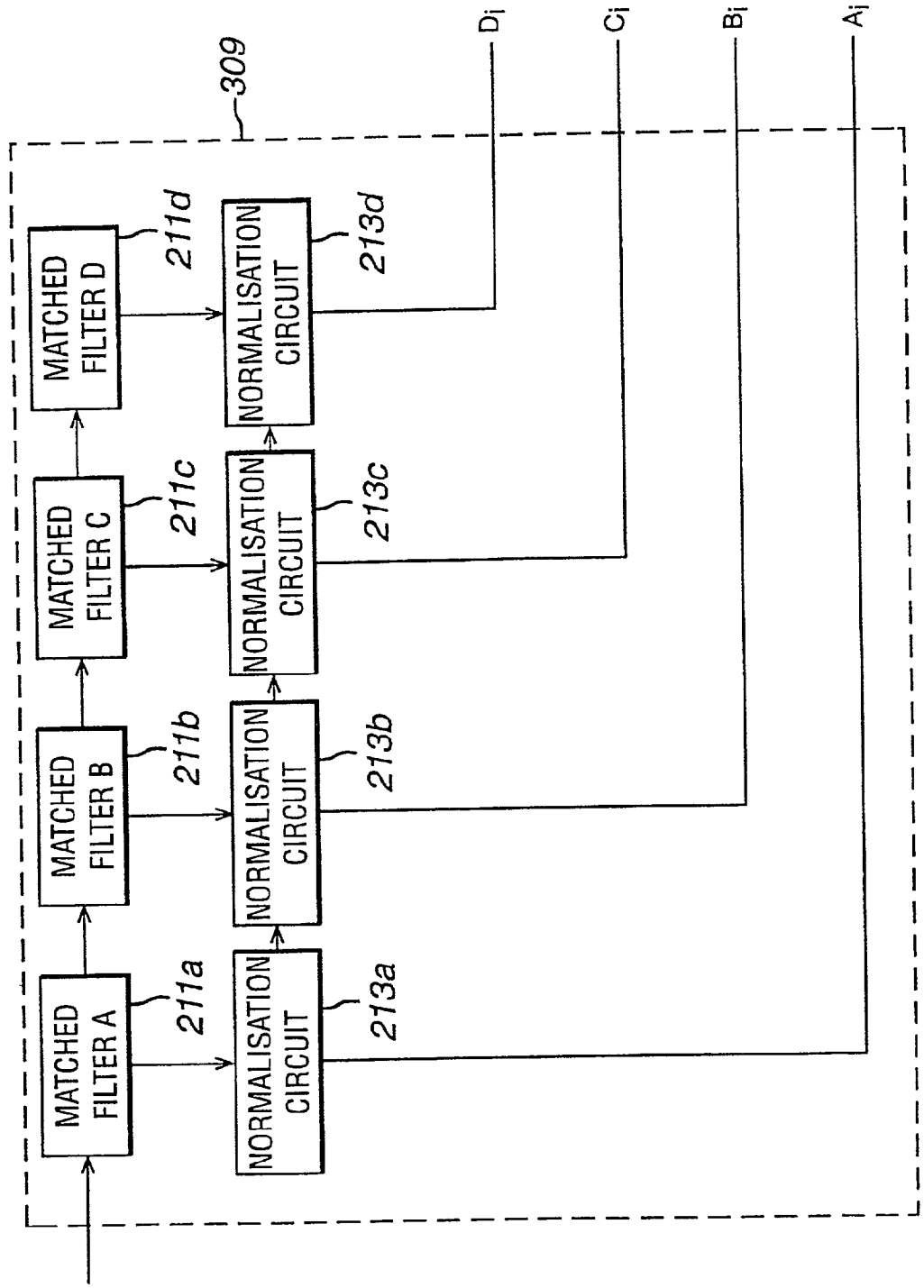
Figure 29:
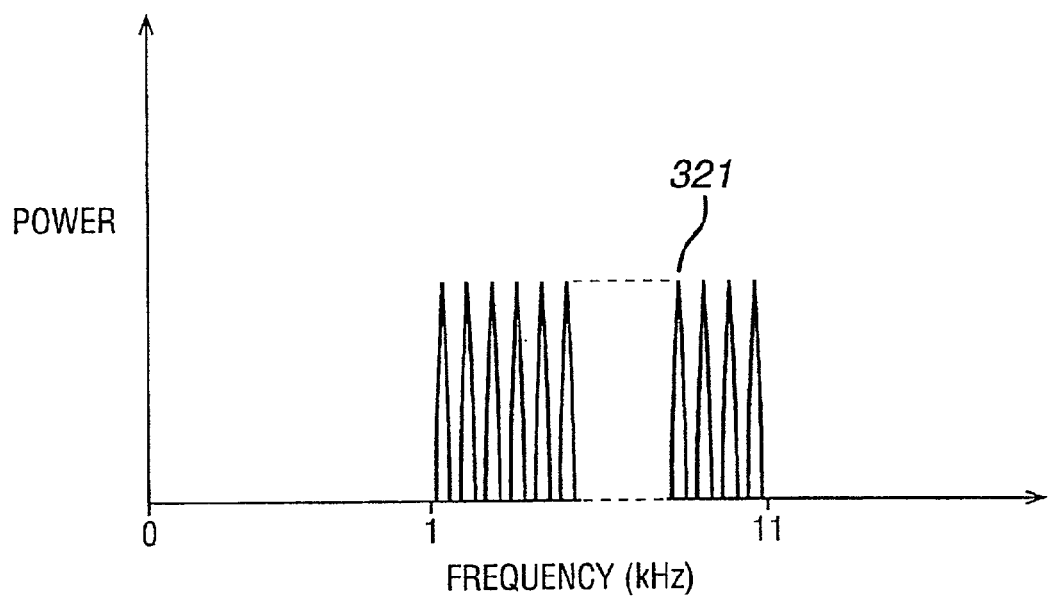
Figure 30:
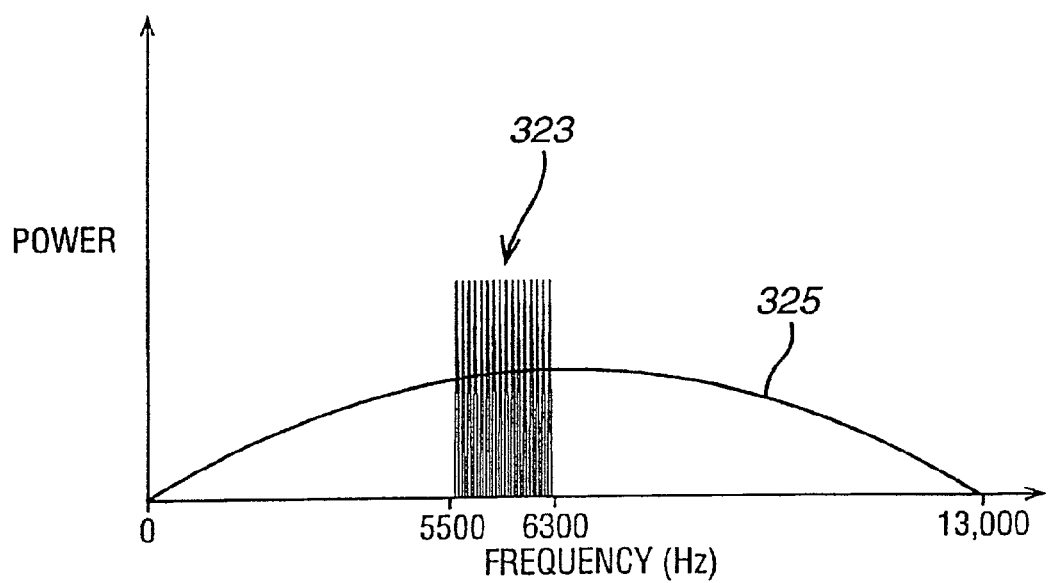
Figure 31:
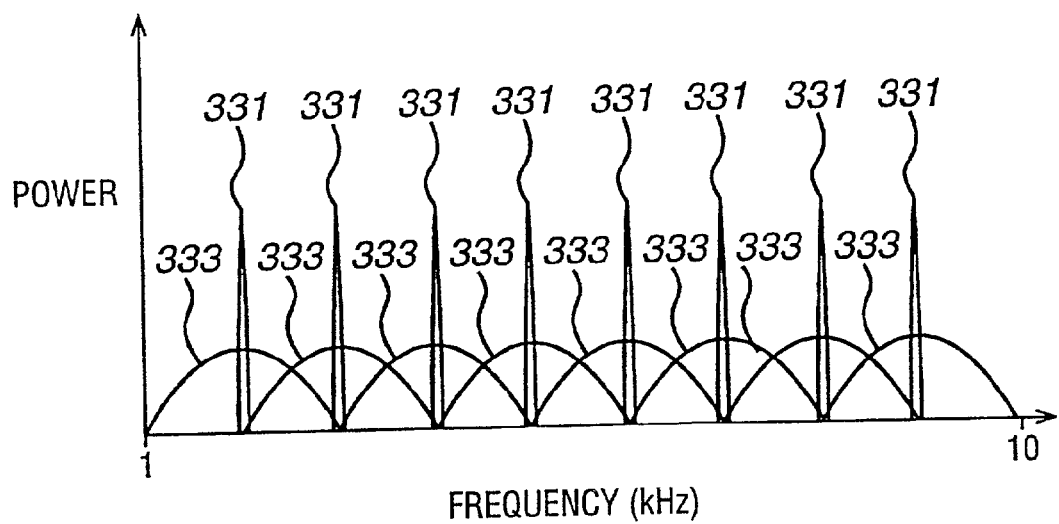
Figure 32:
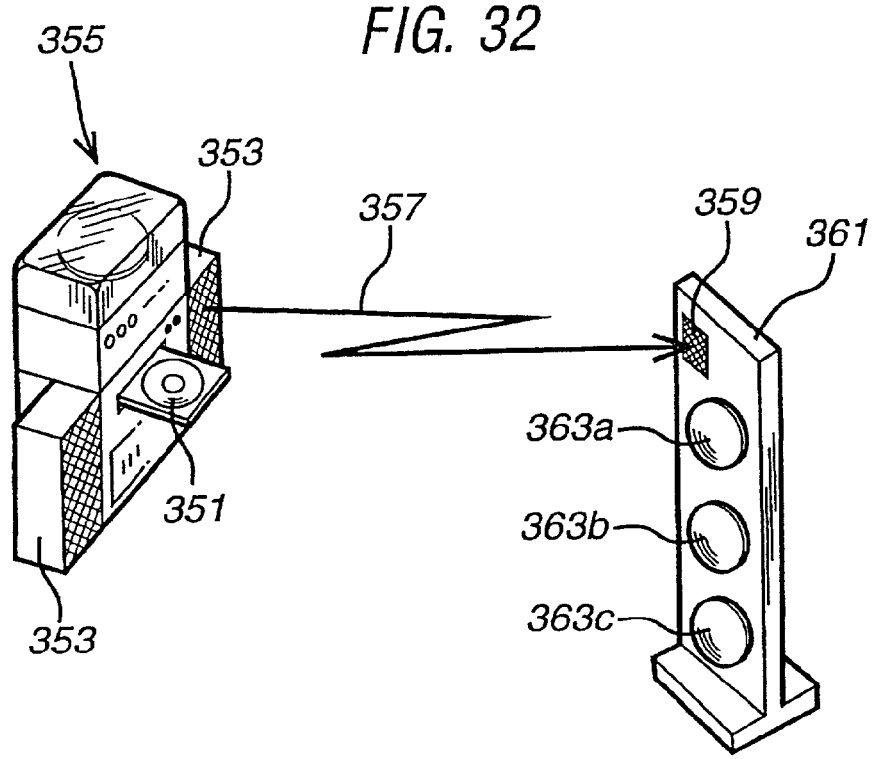
Figure 33:
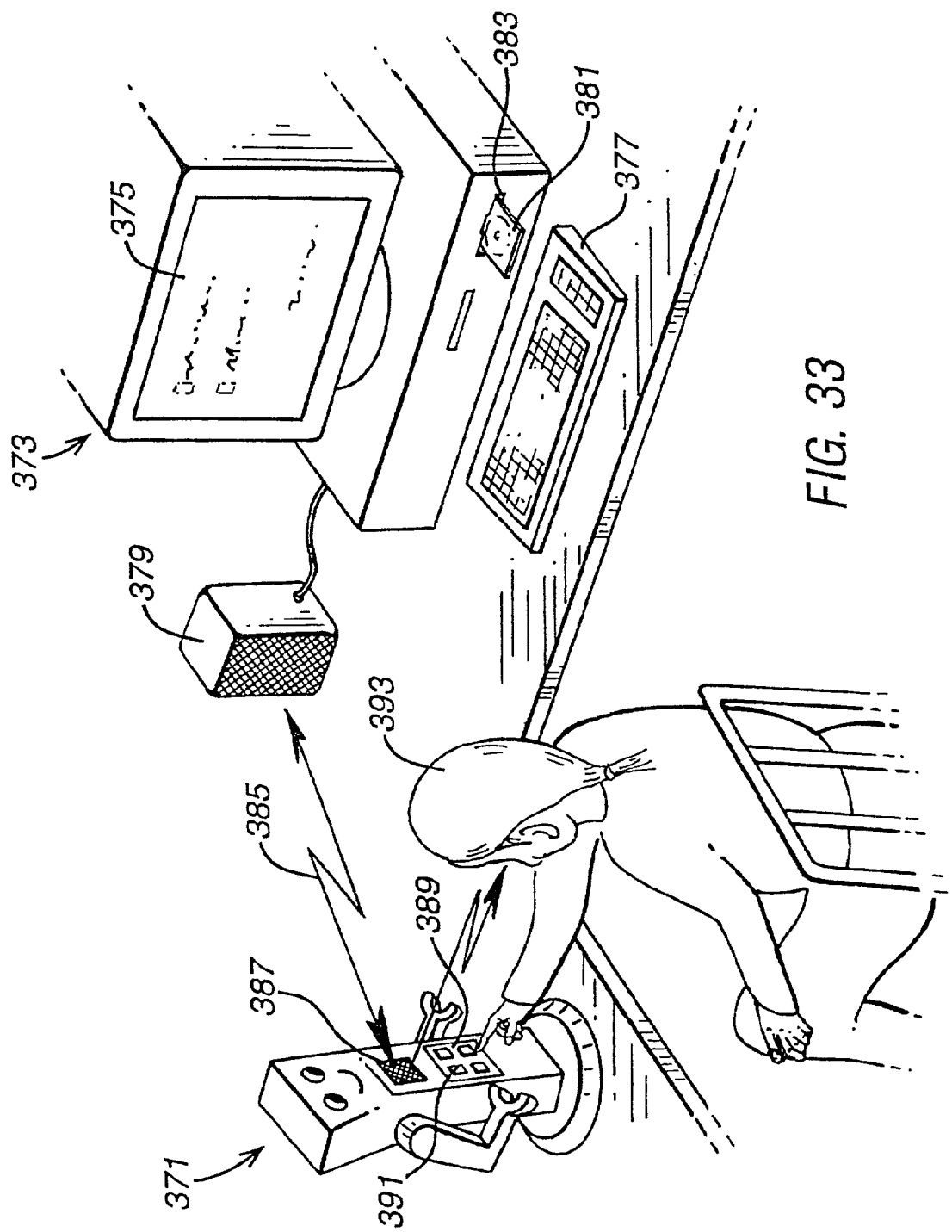
Figure 34:
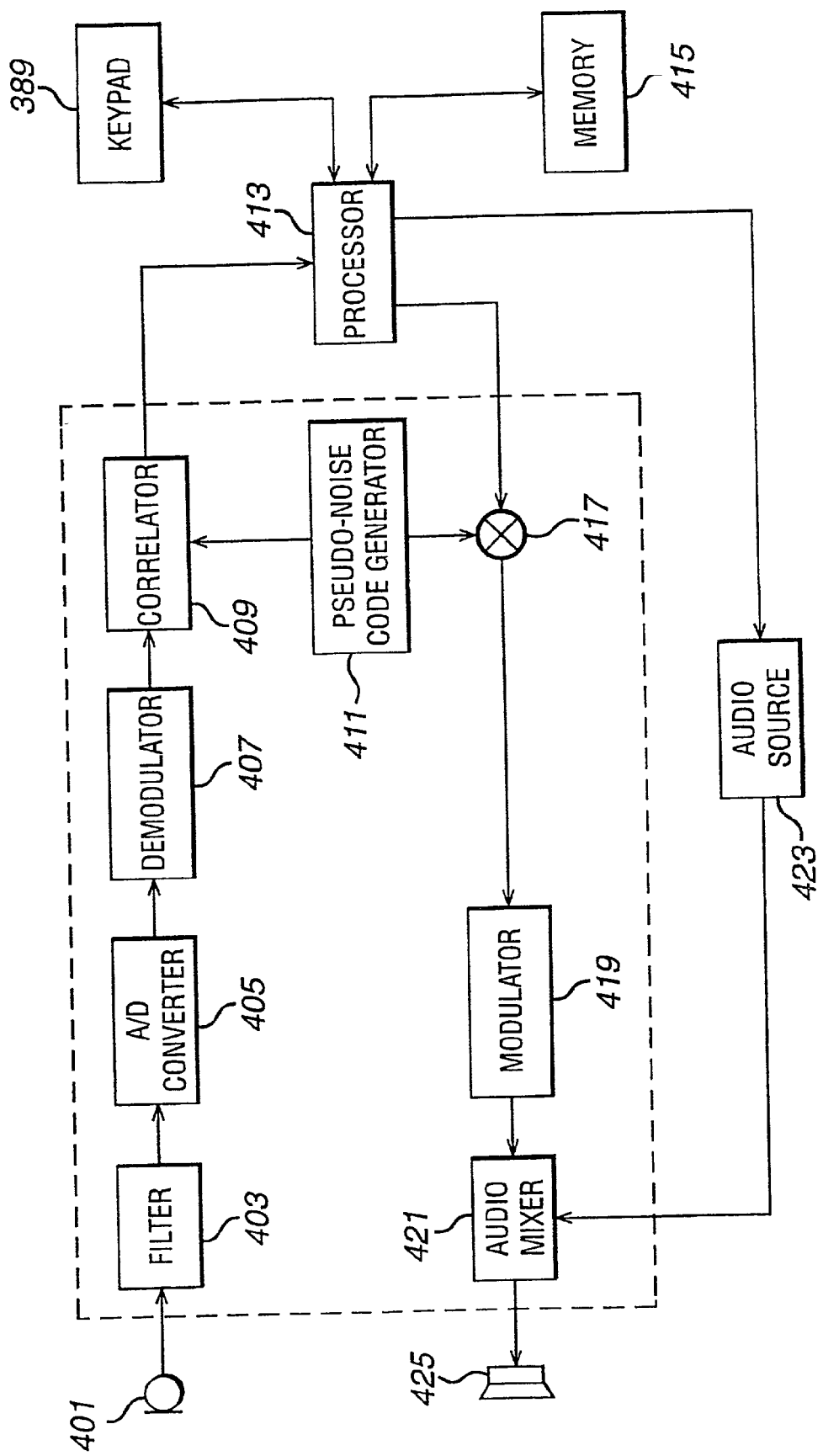

FIG. 5 schematically shows a first alternative encoder to the encoder illustrated in FIG. 2;

FIG. 6 schematically shows a first alternative decoder to the decoder illustrated in FIG. 4;

FIG. 7 schematically shows a second alternative encoder to the encoder illustrated in FIG. 2;

FIG. 8 schematically shows a second alternative decoder to the decoder illustrated in FIG. 4;

FIG. 9 schematically shows a third alternative encoder to the encoder illustrated in FIG. 2;

FIG. 10 is a plot of a power spectrum of the sensitivity of a human ear with and without the presence of a narrowband tone;

FIG. 11 schematically shows a third alternative decoder to the decoder illustrated in FIG. 4;

FIG. 12 schematically shows a fourth alternative encoder to the encoder illustrated in FIG. 2;

FIG. 13 schematically shows a fourth alternative decoder to the decoder illustrated in FIG. 4;

FIG. 14 schematically shows a fifth alternative encoder to the encoder illustrated in FIG. 2;

FIG. 15a is a timing diagram illustrating a pseudo-random noise code sequence;

FIG. 15b is a timing diagram illustrating a carrier signal which has been phase modulated by the pseudo-noise code sequence illustrated in FIG. 15a;

FIG. 15c is a timing diagram illustrating a sampled signal obtained by sampling the modulated signal illustrated in FIG. 15b;

FIG. 16 schematically shows a fifth alternative decoder to the decoder illustrated in FIG. 4;

FIG. 17 shows in more detail an acquisition unit of the decoder illustrated in FIG. 16;

FIG. 18 shows in more detail a normalisation circuit of the acquisition unit illustrated in FIG. 17;

FIG. 19 shows in more detail an averaging circuit of the normalisation circuit illustrated in FIG. 18;

FIG. 20 is a plot of the output of the normalisation circuit of the acquisition unit illustrated in FIG. 17 in the presence of a single-path signal;

FIG. 21 is a plot of the output of a cross-correlator of the acquisition unit shown in FIG. 17;

FIG. 22 shows in more detail the components of a processor used in the fifth alternative decoder;

FIG. 23 shows in more detail a power comparator of the fifth alternative decoder;

FIG. 24 is a plot of the output of the normalisation circuit of the acquisition unit illustrated in FIG. 17 in the presence of a multi-path signal;

FIG. 25 schematically shows a sixth alternative decoder to the decoder illustrated in FIG. 4;

FIG. 26 schematically shows a seventh alternative decoder to the decoder illustrated in FIG. 4;

FIG. 27 illustrates a first alternative acquisition unit to the acquisition unit illustrated in FIG. 17;

FIG. 28 illustrates a second alternative acquisition unit to the acquisition unit illustrated in FIG. 17;

FIG. 29 is a plot of the power spectrum of a first alternative data signal to be mixed with an audio track of a television signal;

FIG. 30 is a plot of the power spectrum of a second alternative data signal to be mixed with the audio track of a television signal;

FIG. 31 is a plot of the power spectrum of a third alternative data signal to be mixed with the audio track of a television signal;

FIG. 32 schematically shows a signalling system for communicating data stored in the audio track of a compact disk to a set of lights;

FIG. 33 schematically shows a duplex signalling system for communicating information between a computer and an interactive toy; and FIG. 34 schematically shows the circuitry used in the interactive toy of the signalling system described with reference to FIG. 33.

Figure 1:
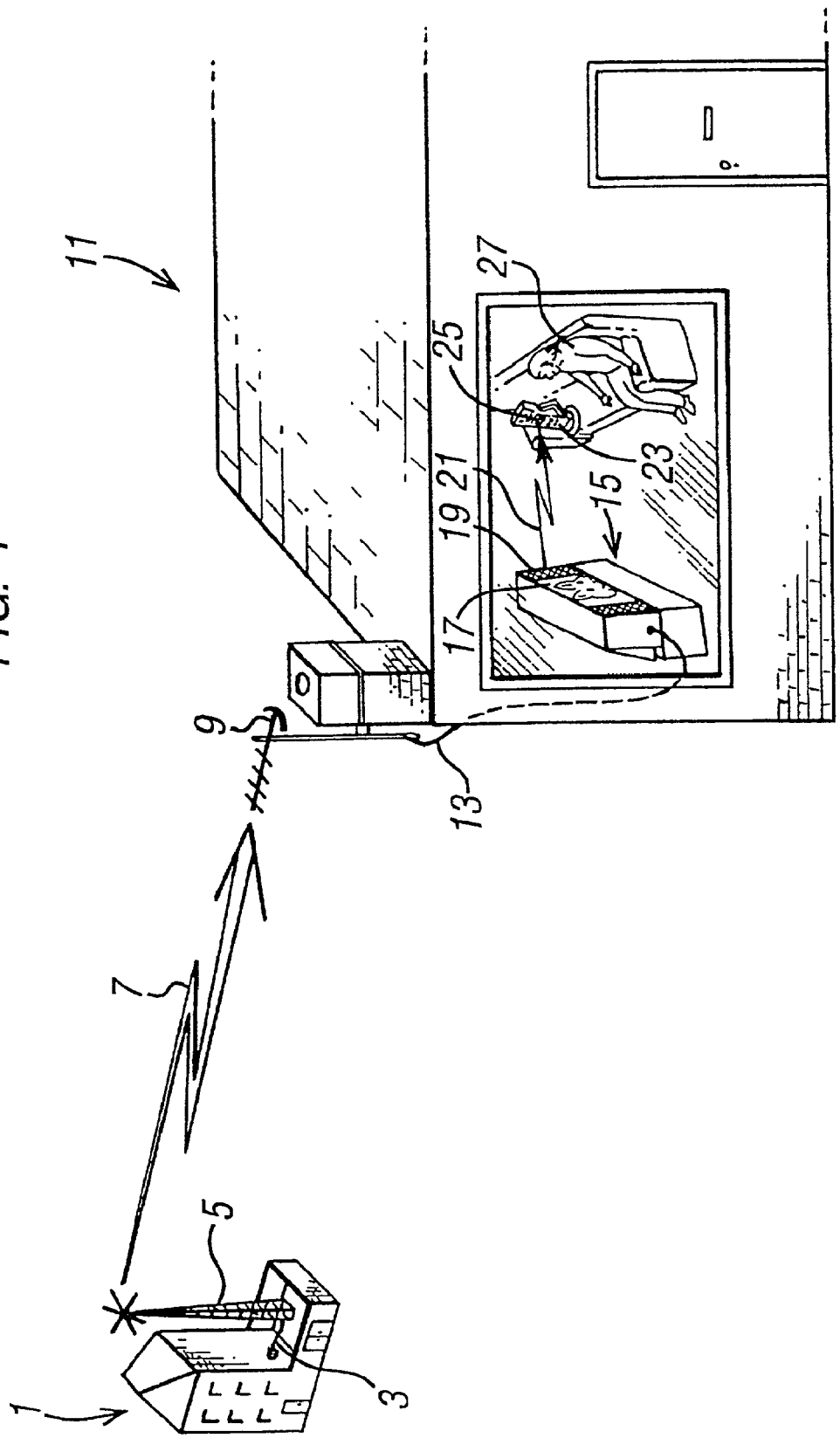

Several embodiments of the invention will now be described with reference to the communication system shown in FIG. 1. FIG. 1 shows a television studio 1 in which a video track and an audio track are generated in a conventional manner. However, an encoder (not shown) at the television studio 1 combines a data signal with the conventional audio track to form a modified audio track. A television signal including the video track and the modified audio track is then sent along a cable 3 to a transmitter 5 which generates a broadcast signal 7 conveying the television signal.

The broadcast signal 7 is detected by an aerial 9 on a house 11 and fed, via a cable 13, to a television set 15 located within the house 11. When the television set 15 is switched on, the video track is displayed as images on a screen 17 and the modified audio signal is output through a loudspeaker 19 as an audio signal 21. It will be appreciated that although only one aerial 9 and one television set 15 have been shown for illustrative purposes, the broadcast signal 7 can in fact be detected by many different aerials provided they are within the range of the transmitter 5.

An interactive toy 23 in the house 11 has a microphone 25 to detect the audio signal 21 output by the loudspeaker 19 and to convert it into a corresponding electrical signal. The microphone 25 is connected to a decoder (not shown) which processes the electrical signal from the microphone 25 to retrieve the data signal encoded in the audio signal 21. In this embodiment the data encoded within the audio track is related to the television programme being broadcast and causes the toy 23 to appear to interact with the television programme by causing it to output sounds relating to the television programme which can be heard by a viewer 27. For example, for a television programme which aims to improve the ability of a child to speak by encouraging the child to repeat phrases, the data signal in the modified audio track can be used to make the toy 23 also repeat the phrases in order to encourage the child to do the same.

As those skilled in the art will appreciate, an advantageous feature of the above-described communication system is that communication between the television studio 1 and the interactive toy 23 can be achieved using a conventional television set 15 and therefore the consumer does not need to buy a new television set or an additional "set top box".

A more detailed description of a first embodiment of the above communication system will now be given with reference to FIGS. 2 to 4. In particular, FIG. 2 shows the audio encoder 31 which combines the audio track, AUDIO, of the television programme (which is supplied from an audio source 33) with the data signal F(t) (which is supplied from a data source 35) to be transmitted to the interactive toy 23. In this embodiment the data signal F(t) is a binary signal having a bit rate of 21.5 bits per second in which each binary 1 is represented as +1 and each binary 0 is represented as −1, e.g. +1 volt and −1 volt respectively.

An advantageous feature of the first embodiment is that a spread spectrum encoding technique is used to spread the energy of the data signal F(t) over a wide range of frequencies. This has the effect of making the data signal less noticeable in the audio signal 21 heard by the viewer 27. In particular, if the data signal F(t) is directly combined with the audio track without such coding, then it is more likely to be heard by the viewer 27 of the television programme.

In this embodiment, direct sequence spread spectrum (DSSS) encoding is utilised to spread the energy of the data signal over a wide band of frequencies. In order to perform the DSSS encoding a pseudo-noise code generator 37 is used to generate a pseudo-noise (PN) code. As those skilled in the art of telecommunications will appreciate, PN codes are binary codes which appear to be completely random in nature, but which are in fact deterministic, i.e. they can be reproduced. In particular, these codes are generated by exclusive-OR feedback from synchronously clocked registers. By continually clocking the registers, the PN code is cyclically reproduced. The number of registers, the registers used in the feedback path and the initialisation state of the registers determines the length of the code and the specific code produced.

In this embodiment, the pseudo-noise code generator 37 has eight registers and generates a PN code having 255 bits (which will hereinafter be referred to as chips using the standard nomenclature in the art to distinguish the bits of the PN code from the bits of the data signal to be spread) in a stream with no sequence of more than 8 chips repeated in the 255 chips. Such a PN code is conventionally referred to as an 8 bit code after the number of registers used to generate it. At the end of each stream of 255 chips a binary 0 is added to make the total length of the stream 256 chips. In this embodiment the PN code is generated at a rate of 5512.5 chips per second and each binary 1 is represented as +1 and each binary 0 is represented as −1, e.g. +1 volt and −1 volt.

The data signal F(t) and the PN code signal are input to a multiplier 39 where they are multiplied together. Thus, each bit of the data signal F(t) is multiplied by a pseudo-random sequence of 256 chips which has the effect of spreading the energy of the data signal F(t) over a broad range of frequencies. The spread signal S(t) output from the multiplier 39 is then input to a modulator 41 which performs a conventional modulation technique, namely continuous phase frequency shift keying (CPFSK), to centre the frequency of the spread signal S(t) at 5512.5 Hz to form a broadband signal H(t).

The broadband signal H(t) and the audio track from the audio source 33 are both input to an audio mixer 43 where they are combined in a simple adding operation. The output of the audio mixer 43 then forms the modified audio track to be transmitted, along with the corresponding video track, as the broadcast signal 7.

Figure 3:
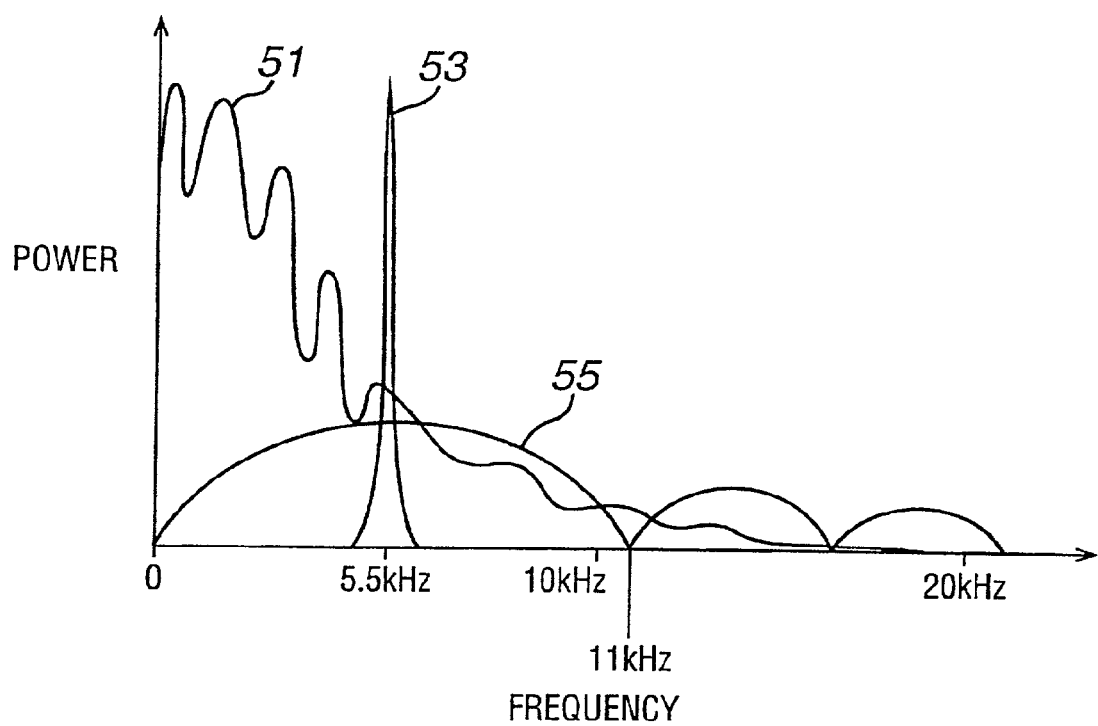
FIG. 3 is a plot comparing the power spectrum of a typical audio track of a television signal with that of a modulated data signal with and without spread spectrum encoding.

The effect of the spread spectrum encoding is illustrated in FIG. 3 which shows a typical audio signal 51 that is in the frequency range of 0 to 18 kHz with, as is normally the case, the power being predominantly concentrated at the lower frequencies. Beyond 15 kHz the sensitivity of the human ear deteriorates and the majority of people cannot hear frequencies above 20 kHz. FIG. 3 also shows the modulated data signal 53 which would result if no spreading was carried out and the data signal F(t) was directly modulated by the modulator 41. As shown, this modulated data signal 53 is a narrowband signal centred at approximately 5.5 kHz and having a peak power significantly above the power level of the audio signal 51 at that frequency. However, if spreading is performed as well as modulating, the spread signal 55 is obtained which has a power spectrum with a main band spread between 0 and 11 kHz and harmonic bands at higher frequencies. As the power of the spread signal 55 is spread over a wider range of frequencies the peak power level is significantly reduced. For many applications the spread signal 55 is not noticeable to the listener 27 or is heard only as background white noise. Further, the majority of the energy of the main band is in a frequency range for which most conventional television loudspeakers work satisfactorily. Thus, there is no requirement for a user to obtain a new television set to take advantage of the invention.

FIG. 4 shows the circuitry which is provided, in this embodiment, in the toy 23. As shown, the toy 23 includes the microphone 25 which picks up the audio signal 21 emitted by the loudspeaker 19 of the television set 15 and converts it into an electrical signal D(t). This electrical signal D(t) is then input to a decoder 63 in which it first passes through a filter 65 to remove high frequency components including the higher harmonic bands of the broadband signal H(t). The filtered signal is then input to an analogue to digital convertor (ADC) 67 where it is converted into a digital signal. In this embodiment, the ADC 67 has a sampling rate of 22.05 kHz, which is twice the highest frequency of the main energy band of the broadband signal H(t). It will be appreciated by a person skilled in the art that this is the minimum sampling frequency enabling full use to be made of the main energy band of the broadband signal H(t) without aliasing. The digital signal is then input to a demodulator 69 to demodulate the CPFSK modulated signal. The demodulated signal B(t) output by the demodulator 69 is then input to a correlator 71 which correlates the demodulated signal B(t) with the same binary PN code used to spread the spectrum of the data signal F(t) in the encoder 31.

In this embodiment the correlator 71 includes a digital matched filter which is matched to the PN code used to spread the spectrum of the data signal in the encoder 31. A pseudo-noise code generator 73 which generates this PN code is connected to the correlator 71 and generates a pseudo-noise code which is used to set the parameters of the digital matched filter. As the pseudo-noise binary code appears to be random, the digital matched filter will output relatively sharp positive and negative peaks when there is a match between the pseudo-noise code and the demodulated signal. In particular, a positive peak is generated when the received signal matches the pseudo-noise code and a negative peak is generated when the received signal matches the inverse of the pseudo-noise code. In this embodiment the correlator 71 also includes circuitry to convert the peaks emitted by the digital matched filter into a binary signal F'(t) which represents a regenerated version of the original data signal F(t).

The regenerated data signal F'(t) is then input to a processor 75 which, in accordance with a program stored in a memory 77, identifies from the regenerated data signal F'(t) a sound file stored in the memory 77 which is to be played to the viewer 27 via a loudspeaker 79 provided on the toy 23.

Therefore, the toy 23 can be made to emit sounds in response to the television programme being shown on the television set 15. In this embodiment the memory 77 is a detachable memory so that a different memory 77 can be placed in the toy 23 for each television programme. In this way, the sound files output by the toy 23 can be updated.

In the first embodiment, the energy of the main band of the broadband signal H(t) is predominantly positioned in the frequency range 2 kHz to 9 kHz. However, the sensitivity of the human ear in this frequency range increases with frequency and for a typical audio signal, in which the energy is concentrated at low frequencies, the higher frequencies of the main band of the broadband signal H(t) can become noticeable. A second embodiment of the invention will now be described with reference to FIGS. 5 and 6 in which the frequency spectrum of the broadband signal H(t) is adjusted, prior to combining with the audio track, to concentrate the energy of the broadband signal H(t) more at low frequencies so that the broadband signal H(t) is less noticeable to the human ear. The components of FIGS. 5 and 6 which are identical to those of the first embodiment have been referenced with the same numerals and will not be described again.

As shown in FIG. 5, in the encoder 83 of the second embodiment, the broadband signal H(t) output from the modulator 41 is passed through a pre-emphasis circuit 85 before being mixed with the audio track in the audio mixer 43. The pre-emphasis circuit 85 applies a shaping algorithm which multiplies the broadband signal H(t) by a frequency-dependent scaling factor. In this embodiment the pre-emphasis circuit 85 is formed by an appropriate digital filter. The output $H_1(t)$ of the pre-emphasis circuit 85 is then input to the audio mixer 43 where it is combined with the audio track as before.

Pre-emphasis has been conventionally applied to radio frequency spread spectrum communication systems to amplify the higher frequencies of a signal because at higher frequencies noise becomes more of a problem. In this embodiment, however, the shaping algorithm applied in the pre-emphasis circuit 85 reduces the amplitude of the broadband signal H(t) at higher frequencies to make the broadband signal H(t) less noticeable to the listener 27. The shaped filter used in this embodiment tapers the amplitude of the broadband signal H(t) by a function whose variation with frequency f is between a $1/f$ and a $1/f^2$ function. In particular, the frequency variation is approximately inverse to the sensitivity of the human ear.

FIG. 6 shows the decoder 89 (which is located in the toy 23) which is used in this embodiment. As shown, the digital signal output by the ADC 67 is input to a de-emphasis circuit 91 which applies an inverse shaping algorithm to the shaping algorithm used in the pre-emphasis circuit 85 of the encoder 83. In this embodiment the de-emphasis circuit is formed by an appropriate digital filter. The output of the de-emphasis circuit 91 is then input to the demodulator 69 and processed as before.

As described above, in the second embodiment the broadband signal H(t) is shaped so that the energy is concentrated more at the lower frequencies. While this may increase errors in the regeneration of the original data signal, the broadband signal is less noticeable to the listener 27 when combined with the audio track and output as audio signal 21. Standard error detection or error detection and correction techniques can be used to help ensure that the original data signal is recovered even if the data signal regenerated by the correlator 71 includes occasional errors.

A third embodiment of the invention will now be described with reference to FIGS. 7 and 8. In the first and second embodiments the broadband signal H(t) combined with the audio track in the audio mixer 43 was generated independently from the audio track. In this embodiment, a dynamic shaping algorithm is used which adjusts the energy of the broadband signal H(t) in dependence upon the energy of the audio track. In FIGS. 7 and 8 features which are identical to those of the first embodiment have been referenced with the same numerals and will not be described again.

As shown in FIG. 7, in the encoder 95 of the third embodiment the audio track generated by the audio source 33 is input to a power monitor 97. The power monitor 97 continually monitors the power of the audio signal and outputs a signal indicative of this power to a pre-emphasis circuit 99.

The broadband signal H(t) output by the modulator 41 is also input to the pre-emphasis circuit 99 where it is multiplied by a time-varying scaling factor which is determined using the signal from the power monitor 97. In this embodiment, the value of the scaling factor at any time is calculated so that the power of the broadband signal H(t) is a fixed amount below the power of the portion of the audio track with which it will be combined, unless this results in the power of the broadband signal H(t) falling below a threshold level in which case the power of the broadband signal H(t) is set equal to that threshold level.

The scaled signal $H_2(t)$ output by the pre-emphasis circuit 99 is then combined in the audio mixer 43 with the audio track, the audio track having passed through a time delay unit 101. The time delay introduced by the time delay unit 101 corresponds to the time required by the power monitor 97 to analyse the audio track and for the pre-emphasis circuit 99 to generate and apply the scaling factor to the broadband signal H(t). Thus, each portion of the audio track is combined in the audio mixer 43 with the portion of the broadband signal H(t) which has been scaled in accordance with the energy in that portion of the audio track.

The use of a dynamic shaping algorithm is advantageous because a fixed shaping algorithm cannot ensure that the level of the broadband signal H(t) is both sufficiently high that it can be decoded during loud passages of the audio track and sufficiently low so that it is unobtrusive during quiet passages of the audio track. By employing a dynamic shaping algorithm it is possible to ensure that the scaled signal $H_2(t)$ can be satisfactorily decoded at all times. However, a minimum level of the scaled signal $H_2(t)$ must be maintained in order to prevent information from being lost. In this embodiment, this is achieved by setting the threshold level below which the power of the scaled signal $H_2(t)$ is not allowed to fall.

As shown in FIG. 8, in this embodiment the electrical signal D(t) input to the decoder 105 of the toy 23 is input to the ADC 67 (which includes an anti-aliasing filter for removing unwanted high frequencies). The digital signal output by the ADC 67 is then input to a power monitor 107 which continually monitors the power of the digital signal and outputs a signal indicative of this power to a de-emphasis circuit 109. The de-emphasis circuit 109 generates a time-varying scaling factor which is approximately inverse to the scaling factor applied in the encoder 95.

The digital signal output by the ADC 67 is also input, via a time delay unit 111, to the de-emphasis circuit 109 where it is multiplied by the scaling factor generated by the de-emphasis circuit 109. As those skilled in the art will appreciate, the time delay unit 111 introduces a time delay which ensures that the value of the scaling factor for each portion of the digital signal output by the ADC 67 is determined by the power of that portion.

As described above, in the third embodiment the power of the broadband signal is maintained a fixed amount below that of the audio signal unless the power of the broadband signal falls below a threshold value in which case it is set at the threshold value. In this way the broadband signal can be made less noticeable to the listener 27 when combined with the audio track and output as the audio signal 21.

A fourth embodiment will now be described, with reference to FIGS. 9 to 11, in which psycho-acoustic analysis techniques are used to scale the broadband signal H(t) before it is combined with the audio track. In FIGS. 9 to 11 features that are identical to those of the third embodiment have been referenced with the same numerals and will not be described again.

FIG. 9 shows the encoder 115 of the fourth embodiment in which the audio track is input to a psycho-acoustic analysis unit 117 to determine scaling information for the broadband signal H(t). In the psycho-acoustic analysis unit 117, the audio track is digitally sampled at a sampling rate of 22.05 kHz and for each sample the frequency spectrum of the continuous stream of 1024 samples ending with that sample is determined. In this way a "sliding window" containing 1024 samples is analysed.

In this embodiment, the psycho-acoustic analysis unit 117 calculates the energy in ten non-overlapping frequency sub-bands spanning 1 kHz to 11 kHz and applies a psycho-acoustic algorithm to generate frequency-dependent scaling factors. For each window of samples, the psycho-acoustic algorithm calculates, for each frequency sub-band of the window, a theoretical level below which the human ear cannot distinguish any sound given the content of the audio track. This will be explained further with reference to FIG. 10 which shows the sensitivity of a typical human ear for different frequencies (in other words, the minimum sound levels for different frequencies which can be heard by a typical human ear) without any background noise (the plot referenced as 123) and in the presence of a narrow band signal 125 (the dashed plot referenced as 127). As can be seen from FIG. 10, the ability of the human ear to distinguish sound in the frequency range of the narrow band signal 125 and in a range of frequencies both above and below the frequency range of the narrow band signal 125 is significantly reduced. There are therefore audio signals which cannot be heard by the human ear in the presence of the narrowband signal 125, even though they would be heard if the narrowband signal is not present. A similar effect to that described above with reference to the frequency domain also exists in the time domain in that after a loud sound stops, the human ear does not immediately recover the sensitivity indicated by the plot 123.

As shown in FIG. 9, the frequency-dependent scaling factors generated by the psycho-acoustic analysis unit are input to a scaling unit 119. The broadband signal H(t) output by the modulator 41 is also input to the scaling unit 119 where the broadband signal H(t) is scaled based on the frequency-dependent scaling factors. In this embodiment, this is achieved by passing the broadband signal H(t) through a filter, whose frequency response has been set in accordance with the current frequency-dependent scaling factors. The output P(t) of the scaling unit 119 is then combined in the audio mixer 43 with the audio track, the audio track having passed through a time delay unit 101 to ensure that each portion of the shaped broadband signal P(t) is combined with the portion of the audio track which was analysed to provide the scaling factors.

This type of psycho-acoustic analysis is now being performed in many audio encoding systems in order to reduce the amount of encoded data by removing information corresponding to sounds which would not be heard (and are therefore redundant) because of high level signals in either neighbouring frequency sub-bands or neighbouring time periods. Therefore, in this embodiment, the scaling factors output by the psycho-acoustic analysis unit 117 are set to ensure that if the audio track output from the audio mixer 43 is subsequently encoded in an audio encoder which utilises a psycho-acoustic evaluation of the audio track to remove redundant information, then the broadband signal H(t) will still be maintained in the encoded audio track. This is achieved by setting the level of the broadband signal H(t) in each frequency sub-band to be on or just above the minimum theoretical sound level that can be distinguished by the ear. As psycho-acoustic algorithms calculate conservative estimates of the minimum theoretical levels, the broadband signal H(t) will not be removed by such encoders while still being hardly noticeable to a listener.

As shown in FIG. 11, in the decoder 131 of this embodiment, the electrical signal D(t) from the microphone 25 is digitally sampled by an ADC 67 at a sampling rate of 22.05 kHz. The digitally sampled signal is input to a psycho-acoustic analysis unit 133 which applies the same psycho-acoustic analysis algorithm as applied in the psycho-acoustic analysis unit 117 in the encoder 115 to generate estimates of the minimum audible levels calculated in the encoder 115. The psycho-acoustic analysis unit 117 then generates inverse frequency-dependent scaling factors, based on these estimated minimum audible levels, which are designed to reverse the effect of the scaling factors applied in the encoder 115, and outputs the inverse scaling factors to a scaling unit 135.

The digital signal output by the ADC 67 is input, via a time delay unit 137, to the scaling unit 135 where it is scaled by the frequency-dependent inverse scaling factors, again by passing the delayed signal through an appropriate filter whose frequency response has been set using the current set of frequency-dependent inverse scaling factors. As before, the time delay unit 137 introduces a time delay which ensures that each portion of the digital signal is scaled by the inverse scaling factors generated for that portion.

To summarise, the use of a psycho-acoustic algorithm as described above has the advantage that the energy distribution of the broadband signal can be adjusted to reduce its obtrusiveness when combined with the audio track. Further, by a suitable setting of the frequency-dependent scaling factors, if the modified audio track is subsequently encoded using a psycho-acoustic algorithm the possibility of the broadband signal H(t) being removed to such an extent that the data signal F(t) can not be regenerated is reduced.

In the fourth embodiment, the frequency-dependent scaling factors are generated for a sliding window which moves in steps of a single sample. It has been found, however, that the bit error rate (BER) of the decoder is significantly reduced if the same frequency-dependent scaling factors are applied throughout each segment of the broadband signal H(t) corresponding to one data bit of the data signal F(t). A fifth embodiment will now be described, with reference to FIGS. 12 and 13, in which this type of processing is performed. In FIGS. 12 and 13, features which are identical to those of the fourth embodiment have been referenced with the same numerals and will not be described again.

FIG. 12 shows the encoder of the fifth embodiment in which the audio track is input to a segmentation unit 143 which separates the audio track into segments whose duration is equal to the duration of a single data bit (which in this embodiment is approximately 46 ms). The audio track is then input segment-by-segment into a psycho-acoustic analysis unit 145 which analyses the frequency spectrum of each segment to generate frequency-dependent scaling factors which are output to a scaling unit 147. The psycho-acoustic algorithm for generating the scaling factors for a segment is identical to that used in the fourth embodiment described above.

The broadband signal H(t) is also input, via a segmentation unit 149, to the scaling unit 147. The segmentation unit 149 separates the broadband signal H(t) into segments with each segment containing 256 chips which correspond to a single data bit of the data signal F(t). In the scaling unit each segment output by the segmentation unit 149 is scaled using a filter whose frequency response has been set in accordance with the current set of frequency dependent scaling factors output by the segmentation unit 143. The shaped broadband signal P'(t) output by the scaling unit is then input to the audio mixer 43 where it is combined with the audio track, the audio track having passed through a time delay unit 101 to ensure that each segment of the shaped broadband signal P'(t) is combined with the segment of the audio track which was analysed to provide the scaling factors for that segment of the shaped broadband signal P'(t).

As shown in FIG. 13, in the decoder 151 of this embodiment, the digital signal output by the ADC 67 is input to a segmentation unit 153 which separates the digital signal into segments each containing 1024 samples. In order to ensure that these 1024 samples correspond to a single data bit, the output of the correlator 71 is fed back to the segmentation unit 153 to provide timing information from which the segmentation unit 153 can determine where the start and end of each segment is positioned. Each segment is then input to a psycho-acoustic analysis unit 155 which analyses the energy content of the segment in the same manner as the psycho-acoustic analysis unit 145 in the encoder 141, but generates frequency-dependent scaling factors which are approximately inverse to those generated in the encoder 141. The generated scaling factors are then input to a scaling unit 157.

Each segment output by the segmentation unit 153 is also input, via a time delay unit 159, to the scaling unit 157 where the delayed samples are filtered by a filter having a frequency response set by the corresponding frequency-dependent scaling factors output by the psycho-acoustic analysis unit 155. As before, the time delay unit 159 introduces a time delay to allow for the time required for the psycho-acoustic analysis unit 155 to generate the scaling factors and therefore each segment is scaled using scaling factors generated by analysing the energy distribution of that segment. The signal output by the scaling unit 157 is then demodulated and correlated with the pseudo-noise code sequence to regenerate the data signal F(t).

In the first to fifth embodiments, the pseudo-noise code generator 37 generates an 8 bit code having 255 bits. The broadband signal H(t) generated using an 8 bit code, while often satisfactory, may still be noticeable in the audio signal output by the loudspeaker 19. In order to reduce the noise of the broadband signal H(t) it is preferred that a longer pseudo-noise code sequence is used. In particular, using a 10 bit code (which forms a sequence of 1023 chips in a stream with no sequence of more than 10 chips repeated in the 1023 chips) or a 12 bit code (which forms a sequence of 4095 chips in a stream with no sequence of more than 12 chips repeated in the 4095 chips), while still multiplying each bit of the data signal F(t) by a 256 chip sequence so that neighbouring bits are multiplied by different chip sequences, provides a significant improvement in the unobtrusiveness of the broadband signal H(t) in the audio signal.

An arrangement using correlators formed by digital matched filters, as used in the first to fifth embodiments, could be used to despread the audio signal conveying a data signal spread using such longer PN code sequences. This is commonly referred to as incoherent despreading. However, it is preferred that the signal detected by the microphone 61 is despread by synchronously multiplying the detected signal D(t) with the same pseudo-noise code as was used for encoding the data signal F(t), because this enables a more reliable regeneration of the original data signal to be achieved. Despreading by synchronous multiplication is commonly referred to as coherent despreading.

A sixth embodiment which uses coherent despreading will now be described with reference to FIGS. 14 to 23. FIG. 14 shows the encoder 161 used in this embodiment. In this embodiment, the data signal F(t) is a logic signal which, as in the previous embodiments, is generated at approximately 21.5 bits per second. In this embodiment, a phase shift keying (PSK) modulation technique is used to modulate the spread data signal I(t) to form a spread signal G(t) centred at about 5.5 kHz. Further, as shown in FIG. 14, the encoder 161 includes two pseudo-noise code generators 163, 165 for spreading the data signal F(t). The first pseudo-noise code generator 163 generates a code sequence PN1, by repeating a first 12 bit PN code with an extra binary 0 added to the end of each sequence of 4095 chips, at a chip rate of 5512.5 Hz. Similarly, the second pseudo-noise code generator 163 generates a code sequence PN2, by repeating a second different 12 bit PN code with an extra binary 0 added to the end of each sequence of 4095 chips, at a chip rate of 5512.5 Hz. In this embodiment, the first and second PN codes are orthogonal to each other and therefore if they are multiplied together chip by chip another pseudo-noise sequence is generated.

The data signal F(t) and PN1 are input to a first AND gate 167a while the inverse of the data signal F(t) and PN2 are input to a second AND gate 167b, with the outputs of the first and second AND gates connected together to form a common output. In this way a logic signal I(t) is formed at the common output in which every "1" of the data signal F(t) has been converted into a 256 chip sequence from PN1 and every "0" of the data signal F(t) has been converted into a 256 chip sequence from PN2. The logic signal I(t) is input to a modulator 169 which uses phase shift keying to modulate a 5512.5 Hz carrier signal generated by an oscillator 171. This will be explained further with reference to FIGS. 15A and 15B which show an eight chip sequence of the logic signal I(t) and the corresponding modulated signal G(t) output by the modulator 169 respectively. As can be seen from FIGS. 15A and 15B, whenever the logic signal I(t) undergoes a change of state, a phase shift of 1800 is introduced into the carrier signal. In this way the spread signal G(t) is generated with a main energy band from baseband to 11 kHz and higher frequency subbands. The spread signal G(t) output from the modulator 169 is then input to an audio mixer 173 where it is combined with the audio track using a simple adding operation to form the modified audio track.

FIG. 16 shows the decoder 181 of the sixth embodiment. The electrical signal D(t) from the microphone 25 is input to an ADC 183 (which includes an anti-aliasing filter to remove unwanted high frequencies) where it is sampled at a rate of about 22.05 kHz (4 times the chip rate), the exact rate being determined by a clock signal clk, to form a digital signal J(t). FIG. 15C shows an example of the samples obtained by sampling an electrical signal D(t) containing just the spread signal G(t) illustrated in FIG. 15B.

In order to perform coherent despreading, the digital signal J(t) is separately multiplied by the code sequences PN1 and PN2. It is, however, necessary to ensure that the chip sequence in the electrical signal D(t) and the chip sequences of the codes PN1 and PN2 are time-synchronised. To achieve an initial synchronisation, the digital signal J(t) is input to an acquisition unit 185. The acquisition unit 185 generates signals which are analysed by a processor 187 which generates a signal F to control the rate of the clock signal clk generated by a clock 189, and signals X and Y for controlling the timing of the generation of the codes by the first and second pseudo-noise code generators 191 and 193 respectively.

FIG. 17 shows in more detail the contents of the acquisition unit 185 and the signals that are generated by the acquisition unit 185 and supplied to the processor 187. In this embodiment, the processor 187 first removes any frequency offset between the chip rate of the chip sequence in the electrical signal D(t) and the chip rate of the first and second pseudo-noise code generators 191, 193 by adjusting the clock rate. This is necessary for two main reasons. The first reason is that if it is not done, then there will always be a slight difference between the clock frequencies used to generate the pseudo-noise codes in the encoder 161 and in the decoder 181 respectively. The second reason is that even if identical clock frequencies are used in the encoder and the decoder, frequency shifts caused by Doppler effects can occur which affect the chip rate in the detected signal. Therefore, without control of the rate at which the codes PN1 and PN2 are generated in the decoder 181 it would be necessary to perform re-synchronisation on a frequent basis.

As shown in FIG. 17, the samples of the digital signal J(t) from the microphone 25 are input to a series of four digital matched filters 211a to 211d which are arranged in series so that the cascade output (indicated in FIG. 17 by a) of the first matched filter is input to the second matched filter and so on. Each filter has 2.048 taps, with the taps of the first matched filter 211a being matched to the first two bits of a SYNC byte, the taps of the second matched filter 211b being matched to the third and fourth bits of the SYNC byte, the taps of the third matched filter 211c being matched to the fifth and sixth bits of the SYNC byte and the taps of the fourth matched filter being matched to the seventh and eighth bits of the SYNC byte (1024 taps are required for each data bit because each data bit is multiplied by 256 chips and each chip is to be sampled four times).

The reason why a single matched filter having 8192 taps is not used rather than the four series connected matched filters 211 will now be described. In particular, if a single large matched filter was used in order to detect the SYNC byte, and if the rate at which the codes PN1 and PN2 are generated is different to the chip rate in the received electrical signal D(t), then this lack of synchronisation will be more noticeable. This is because a large single matched filter performs the correlation over a larger time window and consequently the effects of the lack of synchronisation can build up over a longer period of time, thereby degrading the score output by the single matched filter. In contrast, by using a number of smaller series connected matched filters, the time window over which each of the matched filters performs the correlation is much smaller than that of the larger single matched filter. Hence, the effect of lack of synchronisation will be less noticeable for each of the individual smaller matched filters. As a result, larger frequency offsets between the chip rate in the received electrical signal D(t) and the chip rate of the codes PN1 and PN2 can be tolerated by using the four matched filters 211 rather than a single matched filter.

The score output by each of the matched filters 211 (which is indicated by output b and which is updated at each clock pulse as the samples of J(t) are clocked through the matched filters) is input to a corresponding one of four normalisation circuits 213a to 213d. The normalisation circuits 213 provide a normalised output for a wide dynamic signal range of the input electrical signal D(t). This enables the output of the normalisation unit to be analysed by a simple thresholding operation.

FIG. 18 shows schematically the contents of each normalisation circuit 213. As shown, the current score from the corresponding matched filter 211 is input to a time delay unit 221 where it is delayed for 1024 clock periods, which corresponds to the time taken for the samples of the digital signal J(t) to propagate halfway through the corresponding one of the matched filters 211. The current score is also input to an averaging circuit 223 which uses the current score to update a running average of the last 2048 scores. The output of the time delay unit 221 is then input to a divider 225 which divides the delayed score by the current value of the running average, to produce the normalised output. The above processing makes the normalisation circuit particularly well suited to systems where a spread spectrum signal is hidden in an acoustic signal, because the acoustic signal will typically vary over a large dynamic range.

FIG. 19 shows in more detail the contents of the averaging circuit 223. As shown, the current score is input to a time delay unit 231, where it is delayed for 2048 clock periods, and an adder 233 where the inverse of the time delayed score is added to the current score. The output of the adder 233 is then input to a second adder 235 where it is added to the current value of the running average (delayed by one clock cycle) output by the time delay unit 237, to generate a new current value of the running average which is used by the divider circuit 225.

In this embodiment, sequences of SYNC bytes are repeated intermittently within the data signal F(t) output by the data source 35. FIG. 20 shows a typical output of one of the normalisation circuits 213, when two consecutive SYNC bytes pass through the corresponding matched filter 211. In FIG. 20 reference timings 241 have been illustrated which are separated by 8192 clock periods (nominally corresponding to the time required for the samples corresponding to one SYNC byte to pass through the matched filter). The period between two adjacent reference timings 241 will hereinafter be referred to as a frame. A first peak 243 in the normalised score, corresponding to the first SYNC byte, occurs a time $\tau_1$ after the nearest preceding reference timing 241, while a second peak 245, corresponding to the second SYNC byte, occurs a time $\tau_2$ after the nearest preceding reference timing 241. If there is no frequency offset in the chip rates, then $\tau_1$ will be equal to $\tau_2$ (since in 8192 clock periods the samples corresponding to a SYNC byte will pass completely through the four matched filters 211) and the matched filters 211a-211d will all output peaks at the same time. However, if there is a frequency offset in the chip rates, then there will be a timing offset $\tau_{off}$, defined by $\tau_2$-$\tau_1$, between the peaks in neighbouring frames which is dependent on the frequency offset. Further, since there is a frequency offset in the chip rates, the peaks output by the four matched filters 211a to 211d will not occur simultaneously. However, the timing offset ($\tau_{off}$) for the output of each of the normalisation circuits 213 should be identical. In this embodiment, the acquisition unit 185 makes use of this, in order to quantify the frequency offset and hence to correct for it. The way in which it does this will now be described.

As shown in FIG. 17, in this embodiment, the output of each normalisation circuit 213 is input to a corresponding cross-correlator 215a to 215d where it is cross-correlated with the output from the same normalisation circuit for the immediately preceding frame. This is achieved by passing the output score from each normalisation unit 213 through a corresponding time delay unit 217a to 217d which delays the scores by one frame. The output from the normalisation circuit 213 is then cross correlated with the corresponding delayed output, by the cross-correlator 215. In this embodiment, a maximum frequency offset of three chips per SYNC byte is anticipated. Therefore, the cross-correlators 215 only look for a cross-correlation peak over a range of time offsets between the two frames, varying between a three chip lead and a three chip lag. This results in a significant reduction in the amount of processing required by the cross-correlators 215.

FIG. 21 shows a typical output of one of the cross-correlators 215. The x-axis corresponds to the time offset between the two frames output by the normalisation circuit 213 and the y-axis corresponds to the score output by the cross-correlator 215. In this embodiment, twenty-five values of the cross-correlator score are obtained to allow for a maximum time offset of ±three chips. A cross-correlation peak 251 occurs at a time offset $\tau_{off}$ which is equal to $\tau_2$-$\tau_1$. As mentioned above, the time offset for each of the matched filters 211a-211d should be identical and therefore the position of the cross-correlation peak 251 in the output of each of the cross-correlators 215 should be the same. The outputs of the four cross-correlators 215 are therefore added together in an adder 219 and the output of the adder 219, labelled OFFSET in FIG. 17, is input to the processor 187. The processor 187 then calculates the frequency offset (from $\tau_{off}$ and the size of the correlation window of the matched filters 211) and sends a control signal F to the clock 189 to adjust the clock frequency in order to reduce the frequency offset to a manageable amount.

Once the frequency offset has been reduced in this way, it is then necessary to synchronise the codes PN1 and PN2 generated by the first and second pseudo-noise code generators 191 and 193 respectively, with the chip sequence in the detected electrical signal D(t). In this embodiment, this is achieved by inputting the output scores $A_i$, $B_i$, $C_i$ and $D_i$ from the four normalisation circuits 213 directly into the processor 187 which determines, from the largest peak present in the four outputs, the timing of the chip sequence in the detected electrical signal D(t). The processor then outputs control signals X and Y to the first and second pseudo-noise code generators 191 and 193 respectively, in accordance with the timing of the largest peak to achieve time synchronisation.

In this embodiment, the processor 187 is a microprocessor based system which is schematically illustrated in FIG. 22. As shown, the processor includes an interface circuit 255 for interfacing a central processing unit (CPU) 257 with the normalised scores $A_i$, $B_i$, $C_i$ and $D_i$ output from the normalisation circuits 213 and for interfacing the CPU with the adder 219 and the two pseudo-noise generators 191 and 193. As shown in FIG. 22, the interface circuit 255 also receives a signal (TRACK) which is used in tracking which will be described in more detail below. In carrying out the calculations described above, the processor 187 processes the values received from the interface 255 in accordance with predetermined instructions stored in a program memory 259. A working memory (RAM) 261 is also provided in which the CPU 257 can perform the various calculations. A user interface 263 is also provided to allow a user to adjust the settings of the processor 187, for example in order to change or alter the program instructions stored in the program memory 259 so that the decoder can be reconfigured.

Returning to FIG. 16, when synchronisation has been achieved, data encoded in the digital signal J(t) can be extracted by inputting the digital signal J(t) to a correlator unit 195 (indicated by dotted lines) in which the digital signal J(t) is synchronously multiplied by PN1 and PN2. As shown in FIG. 16, the correlator unit 195 comprises three channels labelled late, on-time and early. As will be explained in detail, the three channels enable the time synchronisation to be tracked while data other than the SYNC byte is being transmitted.

The digital signal J(t) is input into each of the three channels of the correlator unit 195 and in each channel it is separately multiplied by PN1 and PN2. In the late channel, the digital signal J(t) is input to a multiplier 199a, where it is multiplied by PN1 time-delayed by two clock periods by a time delay unit 197a, and to a multiplier 201a, where it is multiplied by PN2 time delayed by two clock periods by a time delay unit 197c. Similarly, in the on-time channel the digital signal is input to a multiplier 199b, where it is multiplied by PN1 time-delayed by one clock period by a time delay unit 197b, and to a multiplier 201b, where it is multiplied by PN2 time-delayed by one clock period by a time delay unit 197d. In the early channel, the digital signal is input to a multiplier 199c, where it is multiplied by PN1, and to a multiplier 201c, where it is multiplied by PN2.

When the digital signal J(t) is multiplied by PN1, if the chip sequence of the signal J(t) matches PN1, then a narrowband signal at about the carrier frequency of 5512.5 Hz will be generated. Similarly, when the digital signal J(t) is multiplied by PN2, if the chip sequence of the signal J(t) matches PN2, then a narrowband signal at the carrier frequency will be generated. Thus, for each channel, if the received data bit is a "1", then the output of the multipliers 199 will contain a narrowband signal at the carrier frequency and, because PN1 and PN2 are orthogonal, the output of the multipliers 201 will not contain the narrowband signal. Similarly, if the received data bit is a "0", then the output of the multipliers 201 will contain the narrowband signal at the carrier frequency and the output of the multipliers 199 will not.

For each channel, the outputs of the two multipliers 199 and 201 are input to a corresponding power comparator 203a to 203c, which is shown in more detail in FIG. 23. As shown, in the power comparator 203, the outputs of the two multipliers 199 and 201 are input to respective bandpass filter 267a and 267b which are centred on the carrier frequency. The output of each bandpass filter 267 is then input to a respective power monitor 269a or 269b, which determines the power of the signal output from the corresponding bandpass filter 267. As mentioned above, when the received data bit is a "1", the output from the power monitor 269b should be greater than the output from the power monitor 269a. In contrast, when the received data bit is a "0", the output from the power monitor 269a should be greater than the output from the power monitor 269b. Therefore, the outputs from the power monitors 269 are input to a comparator 271 which outputs a value in dependence upon the difference between the outputs of the two power monitors 269. In this embodiment, the output from the power monitor 269a is input to the positive terminal of the comparator 271 and the output from power monitor 269b is input to the negative input of the comparator 271. Therefore, if the received data bit is a "1", then the output of the comparator 271 will be positive and if the received data bit is a "0", then the output of the comparator 271 will be negative.

Returning to FIG. 16, the output of the power comparator 203b in the on-time channel is input to a data regeneration circuit where it is converted into the regenerated data signal F'(t). The output of the power comparator 203b in the on-time channel is also input, together with the outputs of the power comparators 203a and 203c of the late and early channels, into an analysis unit 207. The analysis unit 207 determines which of the power comparators 203 provides the largest output, or in other words in which channel there is the best match between the chip sequence in the digital signal J(t) with PN1 and PN2. If the power comparator 203a in the late channel provides the largest output, then the analysis unit 207 sends a signal (on control line labelled TRACK) to the processor 187 indicating that the clock should skip a sample so that the power comparator 203b in the on-time channel once more produces the largest output. Similarly, if the power comparator 203c in the early channel produces the largest output, then the analysis unit 207 outputs a signal to the processor 187 which causes the clock 189 to make a double sample so that the comparator 203b of the on-time channel once more produces the largest output. In this way a tracking operation is accomplished in which the synchronisation of PN1 and PN2 with the chip sequence encoded in the signal J(t) is checked on a sample-by-sample basis and, if necessary, the timing of PN1 and PN2 is adjusted to correct for a reduction in synchronisation.

FIG. 20 shows an exemplary output of the normalisation circuit in which only a single peak 245 is present in each frame corresponding to a single acoustic path between the loudspeaker 19 and the microphone 25. However, as shown in FIG. 24, typically a group 275 of several peaks is present in each frame because in the present application, as shown in FIG. 1, the television set 17 is located within a room and generally different paths will exist between the loudspeaker 19 and the microphone 25 (due to reflections off walls etc) and the signals travelling along these different paths arrive at the microphone 25 at different times. Thus, the electrical signal D(t) generated by the microphone 25 has several components, with each component corresponding to a path with a different time of flight, and a peak is formed corresponding to each of these components. As shown in FIG. 24, the strongest component appears a time $\tau_1$ after the reference time 241, followed by further peaks at times $\tau_2$, $\tau_3$, $\tau_4$, and $\tau_5$.

It will be appreciated by the skilled person that the acquisition unit 185 described above is robust in the presence of these multi-path peaks because, although the signals output by the normalisation circuits will include several peaks per frame, the output of each cross-correlator 215 should still contain just a single peak as the intervals between the peaks should remain constant. Further, the determination of the time synchronisation in this embodiment is only based on the largest peak output by a normalisation circuit 213 and therefore the smaller peaks corresponding to the other paths are ignored.

However, this means that the information contained in the other components is not used when regenerating the data signal F(t). A seventh embodiment will now be described with reference to FIG. 25 in which some of these other components are used as well as the strongest component to regenerate the data signal. In particular, in this embodiment a "four-pronged rake receiver" is used which allows information contained in four components of the received signal D(t) to be used.

The encoder of the seventh embodiment is identical to that of the sixth embodiment and will not, therefore, be described again. The decoder 281 of the seventh embodiment is shown in FIG. 25 in which features which are identical to those of the decoder 181 of the sixth embodiment have been referenced with the same numerals and will not be described again.

As shown in FIG. 25, the digital signal J(t) output by the ADC 183 is input to the acquisition unit 185 and to four time delay units 283a, 283b, 283c and 283d, each time delay unit being in a different prong of the rake receiver. In this embodiment, the processor 187 determines from the outputs $A_i$, $B_i$, $C_i$ and $D_i$ of the normalisation circuits 213 of the acquisition unit 185, the timings of the four strongest components of the digital signal J(t) relative to the reference timing 241. For example, for the output illustrated in FIG. 24, the four timings are $\tau_1$, $\tau_2$, $\tau_3$, and $\tau_4$. Four control signals are then generated by the processor 187, each corresponding to a respective one of these four timings. As shown in FIG. 25, each control signal is input to a corresponding one of the four time delay units 283a, 283b, 283c and 283d so that each time delay unit outputs a signal for which a respective one of the four strongest components of the digital signal J(t) will be time synchronised with PN1 and PN2.

The signal output from each time delay unit 283a, 283b, 283c and 283d is then input to a corresponding one of four correlator units 195a, 195b, 195c and 195d, each of which is identical to the correlator unit 195 in the sixth embodiment. As a result of the time delays introduced by the time delay units 283, the outputs of the four correlator units 195a, 195b, 195c and 195d should be in phase. Therefore, the output of the multiplier 199a in the late channel of each correlator 195a to 195d is input to a first adder 285a where they are added together and the output of the multiplier 201a in the late channel of each correlator unit 195a to 195d is input to a second adder 285b where they are added together. Similarly, the outputs of the on-time channels in each correlator are input to third and fourth adders 285c and 285d and the outputs of the early channel in each correlator are input to fifth and sixth adders 285e and 285f respectively.

The output of each adder 285 then forms a respective one of the inputs to the three power comparators 203a, 203b and 203c and the processing proceeds as in the sixth embodiment. As those skilled in the art will appreciate, by using the four strongest components in the electrical signal D(t) output by the microphone 25, a higher signal to noise ratio is achieved compared to using only the strongest component, thereby improving the ability of the decoder 181 to regenerate the original data signal F(t).

In the sixth and seventh embodiments described above, the processor 187 controls a clock signal clk which is used to determine the timings at which the ADC 183 samples the electrical signal D(t). An eighth embodiment will now be described in which the sampling rate of the ADC 183 is fixed, but in which the output of the ADC 183 is re-sampled to overcome the frequency offset problem.

The encoder of the eighth embodiment is identical to that of the sixth embodiment and will not, therefore, be described again. The decoder 291 of the eighth embodiment is shown in FIG. 26 and features which are identical to those of the decoder 181 of the sixth embodiment have been referenced with the same numerals and will not be described again. In the decoder 291 of the eighth embodiment, the ADC 183 samples the electrical signal D(t) from the microphone 25 at a fixed rate of 22.05 kHz. The digital signal J(t) output by the ADC 183 is then input to the acquisition unit 185 and to a re-sampling circuit 293. In this embodiment, the clock signal clk output by the clock 189 is at a frequency of approximately 44.10 kHz, the exact frequency being determined by the chip rate of the chip sequence conveyed by the digital signal J(t). As in the sixth and seventh embodiments, clock pulses can be skipped or doubled during the tracking operation. The pseudo-noise code generators 191 and 193 generate codes PN1 and PN2 respectively, at a rate of one chip every eight clock pulses of the clock signal clk.

The digital signal J(t) is stored in blocks of 8192 samples in the re-sampling circuit 293. The processor 187 determines from the outputs of the cross-correlators 215 of the acquisition unit 185, the chip rate of the chip sequence in the digital signal J(t), and then outputs a signal S to the re-sampling circuit which indicates the rate at which the digital signal J(t) needs to be re-sampled. For example, if the determined chip rate in the digital signal is 5567.625 Hz, which corresponds to an increase of 1% over the nominal chip rate of 5512.5 Hz, then the re-sampling rate has to be 22.2705 kHz to allow for the additional chips present. The re-sampled data is determined in the re-sampling circuit 293 from the 8192 stored samples using interpolation techniques to give, for the exemplary 1% increase in chip rate, 8274 samples. The clock rate is also adjusted to be eight times the chip rate of the chip sequence in the digital signal J(t) and the re-sampled data is then input to the correlator unit 195 at the clock rate where it is multiplied by PN1 and PN2 and the remaining processing proceeds as in the sixth embodiment.

In this embodiment the first and second pseudo-noise code generators 191 and 193 are controlled by the processor 187 to operate only when re-sampled data is input to the correlator unit 195. It will be appreciated by the skilled person that the clock signal clk is run at a faster rate than the sampling rate of the ADC 183 to give time for the re-sampling to take place and for any additional chips to be processed.

MODIFICATIONS AND FURTHER EMBODIMENTS

The person skilled in the art will appreciate that the re-sampling techniques of the eighth embodiment could also be applied to a decoder employing a rake receiver arrangement.

In the sixth to eighth embodiments a specific synchronisation and tracking technique is described. However, it will be appreciated that many modifications could be made to this synchronisation and tracking technique. Parameters, such as the number of matched filters and the number of taps in each matched filter, will depend upon the operational tolerance required for the device. It is desirable to use a long synchronisation sequence in the matched filter because, when there is no frequency offset, increasing the number of taps increases the size of the peak in the output of the matched filter. However, increasing the number of taps in a single matched filter reduces the frequency offset which that matched filter can tolerate.

It has been found that if it is desired to match the taps of the matched filter with a synchronisation sequence comprising N chips, but a frequency offset resulting in a time drift of e chips of the synchronisation sequence must be tolerated across the matched filter, then it is preferred to split the matched filter into (e+1) matched filters with each one matched to N divided by (e+1) chips of the synchronisation sequence. If the above-described cross-correlation technique is then used to measure the frequency offset, then sample offsets spanning from −e chips to +e chips need to be calculated in the cross-correlator.

In the sixth to eighth embodiments, the cross-correlators calculate cross-correlation scores for timing offsets between the two frames which are varied in steps corresponding to a single clock cycle. This is not essential and the cross-correlation could, for example, be calculated for timing offsets of the frames which vary in steps corresponding to 2 or 4 clock cycles. Further, it will be appreciated from FIG. 21 that the frequency offset could be determined with a sub-sample resolution by interpolating the position of the peak from the values of the points neighbouring the maximum cross-correlation score. Another way of obtaining a more accurate measure of the frequency offset is to accumulate the summed outputs of the cross-correlators over more than two frames.

In the sixth to eighth embodiments the matched filters 211a-211d of the acquisition circuit 185 are arranged in series. FIG. 27 illustrates an alternative acquisition unit 301 in which the matched filters are arranged in parallel. In FIG. 27 features which are identical to corresponding features in FIG. 17 have been referenced with the same numerals and will not be described again. The digital signal J(t) is input into four parallel channels. In the first channel the digital signal J(t) is input directly into the first matched filter 211a. In the second channel the digital signal J(t) is input, via a time delay unit 303 which introduces a delay of 2048 clock cycles, into the second matched filter 211b. In the third channel the digital signal J(t) is input, via a time delay unit 305 which introduces a delay of 4096 clock cycles, into the third matched filter 211c. In the fourth channel the digital signal J(t) is input, via a time delay unit 307 which introduces a delay of 6144 clock cycles, into the fourth matched filter 211d. In this way the score outputs $A_i$, $B_i$, $C_i$ and $D_i$ of the first to fourth matched filters 211a to 211d are identical to those for the acquisition unit 185 of the sixth embodiment and therefore the remainder of the acquisition unit 301 functions in the same manner as the acquisition unit 185 of the sixth embodiment.

The acquisition circuits described with reference to FIGS. 17 and 27 have a number of advantages. These advantages include:

(1) The normalisation circuit 213 makes the acquisition circuit capable of analysing input digital signals J(t) whose power spans a wide dynamic range.

(2) Replacing a single long matched filter with four short matched filters improves the ability to generate peaks in the presence of large frequency offsets;

(3) By cross-correlating the output of each normalisation circuit with the output one frame earlier, the output of the cross-correlator for each matched filter is nominally identical and hence the output of each cross-correlator can simply be added together.

(4) By using a cross-correlation to determine the frequency offset, the amount of processing required to determine the frequency offset for multi-path signals is identical to that required for single-path signals.

(5) As the length of the matched filters used will be determined based on a required tolerance of frequency offset for the decoder, the cross-correlation need only be carried out for time offsets between the output of the normalisation circuit for neighbouring frames which fall within this tolerance, thereby reducing the amount of processing performed.

It will be appreciated by the person skilled in the art that the normalisation circuit is not essential to achieve some of the advantages discussed above. An automatic gain control (AGC) circuit at the input to the decoder could be used instead, but the normalisation circuit is preferred because it gives a significant improvement in performance.

It will also be appreciated that the cross-correlation technique, in which the score outputs of neighbouring frames are cross-correlated, could also be applied to the output of a single filter to determine the frequency offset, although using plural filters and adding the results together increases the signal magnitude.

Further, the increased frequency offset tolerance achieved by splitting a single matched filter into a number of smaller matched filters can be achieved without using the cross-correlation technique. FIG. 28 illustrates an alternative acquisition circuit 309 which corresponds to the acquisition circuit 185 illustrated in FIG. 13 with the cross-correlators 215, delay units 217 and adder 219 removed so that the OFFSET signal is not generated and only the scores $A_i$, $B_i$, $C_i$ and $D_i$ of the normalisation circuits 213 for each sample i are input to the processor 187. The processor can then use these scores to keep a number of accumulated scores for different values of frequency offset. The frequency offset can then be determined by comparing the accumulated scores and to determine which has the best score.

For example, the processor 187 may perform a routine in which for each sample the following sums, which correspond to varying timing offsets, are calculated:

$$A_i+B_i+C_i+D_i \quad (1)$$

$$A_i+B_{i+1}+C_{i+2}+D_{i+3} \quad (2)$$

$$A_i+B_{i-1}+C_{i-3}+D_{i-3} \quad (3)$$

$$A_i+B_{i+2}+C_{i+4}+D_{+i} \quad (4)$$

$$A_i+B_{i-2}+C_{i-4}+D_{i-6} \quad (5)$$

$$A_i+B_{i+3}+C_{i+6}+D_{i+9} \quad (6)$$

$$A_i+B_{i-3}+C_{i-6}+D_{i-9} \quad (7)$$

The skilled person will recognise that sum (1) corresponds to no timing offset, sums (2) and (3) correspond to a timing offset of ±3 clock cycles, sums (4) and (5) correspond to a timing offset of ±6 clock cycles, and sums (6) and (7) correspond to a timing offset of ±9 clock cycles. For each sample i, the sums (1) to (7) are compared to a threshold figure which is set such that when one of the sums is above the threshold figure, the frequency offset can be estimated from which of the sums (1) to (7) was used and the time synchronisation can be estimated from the timing of the sample i which caused the sum to exceed the threshold. The skilled person will appreciate that this synchronisation technique is very efficient in terms of the processing power required in comparison to conventional synchronisation techniques because the correlation only has to be performed once. It will also be appreciated by the skilled person that the form of the sums used above can be varied to obtain different timing offsets if desired.

It will be appreciated by those skilled in the art that, because the acoustic signal undergoes an arbitrary phase shift between source and receiver, the output of the matched filters 211 is not always optimal. A complex filter can be used instead of each matched filter in order to remove the dependence on the phase of the incoming signal. As in this application it is the amplitude of the filter output which is most important, the complex filter could be formed by a parallel pair of matched filters each having 2048 taps and being matched to a quadrature pair of signals. The outputs of the matched filters would then be squared, summed and divided by the average output value over one data bit period, to generate a score output which can be compared with a threshold value to give an output which is independent of the input signal phase.

In another alternative acquisition circuit, the configuration illustrated in FIG. 17 is used but each of the matched filters has 256 taps matched to a respective quarter of a 256 chip sequence corresponding to a SYNC bit.

In the seventh embodiment it is assumed that the chip rates of the four strongest components of the electrical signal D(t) are identical so that the same pseudo-noise code generators 191 and 193 can be used for each channel. The person skilled in the art will, however, recognise that if the chip rates were different then the different chip rates would appear as different peaks in the output of the cross-correlators 215, and the processor could control different pseudo-noise code generators for each prong of the rake receiver to operate at different chip rates. This would, however, substantially increase the complexity of the decoder circuitry.

In the first to fifth embodiments, continuous phase frequency shift keying (CPFSK) is used to modulate the data signal onto a carrier in the centre of the audible range of frequencies, while in the sixth to eighth embodiments phase shift keying is used. It will be appreciated that the described embodiments could easily be adapted to allow other modulation techniques to be used. If a technique is used where the receiver does not precisely know the phase and frequency of the received signal, for example standard binary phase shift keying, conventional circuitry such as a Costas loop can be used to extract estimators for these parameters from the received signal.

In all the described embodiments the data signal is first spread and then subsequently modulated. It will be appreciated by the person skilled in the art that the invention could equally be applied to systems in which the data signal is modulated and then subsequently spread. Similarly, in the decoder the received signal may be demodulated then despread or despread and then demodulated.

In the first to eighth embodiments, the data signal F(t) is spread using DSSS encoding. However, the energy of a data signal can be spread over a wide range of frequencies by using techniques other than DSSS encoding. For example, as illustrated by the power spectrum shown in FIG. 29, an orthogonal frequency division modulation (OFDM) technique can be used in which, for example, 256 narrow-band orthogonal carriers 321 carry identical data. These 256 narrow-band carriers are evenly distributed in the frequency range of 1 to 11 kHz and thus spreading of the energy of the data signal is achieved. The original data signal can then be reconstructed by demodulating and recombining each of the narrow-band signals.

It will be appreciated by a person skilled in the art that still further techniques could be used to spread the energy of the data signal. For example, frequency hopping could be used in which the frequency of the modulated data signal is changed in a random manner.

Another alternative to spreading the energy of a single narrow-band data signal over a desired broad range of frequencies is to generate a small number of narrow-band carriers at the centre of the desired frequency range and then to spread each of these narrow-band carriers over the entirety of the desired frequency range using orthogonal PN codes. The power spectrum for such a scheme is illustrated in FIG. 30 in which 16 narrow-band carriers 323 are evenly spaced between 5512.5 Hz and 6300 Hz and each of the narrow-band carriers is spread using DSSS encoding with a chip rate of 5512.5 Hz to form a broadband signal 325.

Alternatively, a number of narrow-band signals can be evenly spaced in the desired frequency range and each of these narrow-band signals can be individually spread to cover a sub-band of the desired frequency range. Such a system is shown in FIG. 31 in which eight narrowband signals 331, each transmitting a data signal at 5 bits per second, are spaced evenly throughout the desired range. Each bit of each of the narrowband signals is multiplied by a corresponding PN code using a 256 chips per bit ratio, to form eight broadband signals 333 spread over a corresponding sub-band of the desired range. This has the advantage that the resulting spread spectrum is significantly flatter than those of the other embodiments. The PN codes used to modulate the eight different signals form an orthogonal set so that each broadband signal 333 can be despread separately. Further, each broadband signal 333 can be adjusted as a whole for the energy of the corresponding segment of audio track which reduces errors caused by non-linear filtering across the entire desired range of frequencies.

In the systems described with reference to FIGS. 29 to 31 a number of narrowband signals are generated. These signals can be used to carry identical data streams which are staggered in time. This has the advantage that if a segment of the data signal is lost, for example due to a loud noise which does not form part of the audio signal 21 output by the loudspeaker 19, then the data in the lost segment will be repeated in different channels subsequently.

As mentioned above, the use of a longer PN code sequence has the effect of reducing the obtrusiveness of the broad band signal H(t) in the modified audio track. Instead of using a pseudo-noise code generator which generates a long sequence, for example a 10 bit code or a 12 bit code, it is possible to use a number of orthogonal shorter sequences, for example 8 bit codes, linked end to end to form a long sequence.

In the sixth to eighth embodiments, the output of each multiplier 199, 201 is input to a bandpass filter followed by a power monitor. Alternatively, the output of each multiplier 199, 201 could be input to a quadrature mixer and the output of the quadrature mixer then input to a low-pass filter with a time constant of the order of the duration of a data bit of the data signal F(t). The output of the low-pass filter can then be used as an input signal to the comparator 271. This provides a computationally efficient implementation.

In the sixth to eighth embodiments, the processor decides, based on the signal TRACK, after every clock cycle which of the early, on-time and late channels produces the best signal. However, in order to reduce the processing load, the processor could alternatively make this decision over longer intervals, for example intervals corresponding to one chip, one data bit or one repetition of the chip sequences PN1 and PN2.

As explained in the sixth embodiment, multiple paths between the loudspeaker 19 and microphone 25 cause multiple peaks to appear in each frame of the output of the normalisation circuit, as shown in FIG. 24. However multiple peaks can also be formed by deliberately combining two time offset broadband signals with the audio track. For example, if the audio track conveys a stereo signal then two identical broadband signals with a time offset of, for example, 150 ms can be generated and each broadband signal can be added to a respective one of the two channels. This has the advantage of adding an additional level of time diversity which enables a more robust regeneration of the data signal. Alternatively, two different broadband signals could be generated with each one being added to a respective channel of the audio track.

In the seventh embodiment each of the signal components is input to a separate correlator unit 195 and the corresponding outputs of each correlator unit 195 are added together. Alternatively, a different rake receiver arrangement could be used in which the signals output by the four time delay units 283 can be added together and input to a single correlator unit where despreading takes place.

In a preferred alternative implementation of the rake receiver, each of the adders 285 weight the output of the corresponding correlator in accordance with the strength of the signal component processed by the correlator. In this way the strongest signal component, which should provide the most accurate data, is given more weight than the weaker components. The peak scores for each of the components calculated by the acquisition unit can be used to generate these weighting factors.

It will be appreciated that the exact number of prongs in the rake receiver can be varied. For example, rake receivers having two or six prongs could be used.

In the fourth and fifth embodiments, psycho-acoustic encoding is performed in which a psycho-acoustic algorithm is used to determine minimum audible levels for a number of frequency sub-bands of a segment of the audio track based on the energy in each frequency sub-band of that segment and preceding segments, and this information is used to obtain scaling factors for the frequency sub-bands. In order to reduce the required processing a simpler algorithm can be applied, although this will result in a more noticeable broadband signal. For example the energy in the preceding segments could be ignored. Further, instead of calculating minimum audible levels, the scaling factors could be calculated so that the power ratio in each frequency band between the audio track and the broadband signal H(t) is held constant. Alternatively, the frequency analysis could be removed so that the algorithm calculates scaling factors based on the entire energy in preceding segments.

In the third embodiment, the decoder 105 includes a power monitor 107 for detecting the power in the electrical signal D(t) and a de-emphasis circuit for scaling the electrical signal in response to the detected power to reverse the scaling carried out in the encoder 95. This conforms with conventional communications principle that for any shaping performed in the transmitter stage, a corresponding reshaping, inverse to the shaping, is performed in the receiver stage. However, the inventors have found that the power monitor 107 and de-emphasis circuit 109 are not essential and the digital signal output by the ADC 67 can be input directly to the demodulator 69. Thus, a more simple decoder such as the decoder 89 of the first embodiment could be used. This is a significant advantage because in most commercial embodiments of the system, the number of decoders will greatly outnumber the number of encoders and therefore it is desirable to keep the cost of each decoder as low as possible. Similarly, the psycho-acoustic analysis unit 133, scaling unit 135 and time delay unit 137 in the decoder 131 of the fourth embodiment and the psycho-acoustic analysis unit 155, scaling unit 157 and time delay unit 159 in the decoder 151 of the fourth embodiment are not essential. By removing the need for the decoder to carry out psycho-acoustic analysis, the amount of processing required to be done by the decoder is significantly reduced which substantially reduces the cost of each decoder.

In the fifth embodiment, the psycho-acoustic analysis unit 155 of the decoder 151 determines scale factors for each frequency sub-band of a segment of the electrical signal D(t) which are inverse to those used in the encoder. It has been found that if the encoder 141 splits the broadband signal H(t) into segments corresponding to an integer number of the original data bits in the data signal F(t), then the original data signal can be regenerated with a high performance level without carrying out psycho-acoustic analysis and de-emphasis in the decoder.

In the fourth and fifth embodiments, the psycho-acoustic analysis unit calculates theoretical minimum audible levels for ten frequency sub-bands. In practice, a larger number of frequency sub-bands can be used, for example two thousand and forty-eight. However, increasing the number of frequency sub-bands will increase the processing load to be performed by the psycho-acoustic analysis unit.

It will be appreciated that all the above-described shaping techniques, including those in the second to fifth embodiments, could be applied to systems employing synchronous multiplication to despread the broadband signal such as those described in the sixth to eighth embodiments.

It will also be appreciated that conventional equalisation techniques can be applied in the decoder to improve the bit error rate in the presence of multi-path components. Further, an automatic gain control circuit could be included at the input of the decoder. It will also be appreciated that standard techniques of error management could be applied in the encoders and the decoders according to the invention.

The precise values of the bit rates, chip rates, sampling rates and modulation frequencies described in the detailed embodiments are not essential features of the invention and can be varied without departing from the invention. Further, while in the described embodiments the data signal is a binary signal, the data signal could be any narrowband signal, for example a modulated signal in which frequency shift keying has been used to represent a "1" data bit by a first frequency and a "0" data bit as a second different frequency.

Although digital signal processing techniques have been described as the preferred implementation of the invention, analog processing techniques could be used instead. It will be appreciated by the person skilled in the art that if in the encoder a digital processing operation is performed to combine the audio track and the broadband signal, it is preferable that the sampling rate be as high as possible to preserve the original quality of the audio.

All the above embodiments have been described with reference to the communication system illustrated in FIG. 1, in which an interactive toy 23 decodes a data signal encoded in an audio signal output by a television set 15 and, in response to the data signal, outputs a sound stored in a memory in the interactive toy 23 which can be heard by a user. Alternatively, the data signal could convey information enabling a speech synthesiser located in the interactive toy 23 to produce a desired sound, for example a word or phrase. Alternatively, the interactive toy 23 could display information on a screen or part of the interactive toy 23 could move in response to the encoded data signal.

It will be appreciated that the television signal need not be broadcast using a transmitter 5 but could be sent to the television set 15 along a cable network. It will also be appreciated that the same techniques could be applied to a radio signal, whether broadcast using a transmitter or sent along a cable network. Further these techniques can be applied to a point-to-point communication system as well as broadcast systems. Further, conventional encryption techniques could be used so that the television or radio signal could only be reproduced after processing by decryption circuitry.

As another alternative, the television signal could be stored on a video cassette, a digital video disk (DVD) or the like. In this way, no signal is transmitted through the atmosphere or through a cable network but rather the television signal is stored on a recording medium which can subsequently be replayed to a user on the user's television set 15. In one application a user can buy a video cassette to be played on a television set 15 using a video player together with a detachable memory for the interactive toy 23 which stores instructions for the interactive toy 23 which are related to the television signal stored on the video cassette. Similarly, data could be encoded in a purely audio signal stored on a recording medium such as an audio cassette, a compact disc (CD) or the like.

As those skilled in the art will appreciate, the sampling rate of 22.05 kHz used in the decoders of the first to sixth embodiments matches that used for compact discs and therefore the encoders and decoders described for these embodiments are suitable for use in systems where a data signal is conveyed by an audio track recorded on a compact disc.

All the above-described embodiments are simplex communication systems in which a data signal is transmitted from a transmitter to a receiver without a signal being returned from the receiver to the transmitter. However, the present invention can equally be applied to a duplex communication system in which data signals are transmitted in both directions between two audio transmitter-and-receiver circuits (which will hereinafter be referred to as audio transceivers). An example of such a duplex communication system is illustrated in FIG. 33 in which data signals are transmitted in both directions between an interactive toy 221 and a multimedia computer 223 while the interactive toy outputs background music (which reduces the audibility of the audio signals transmitted between the interactive toy 221 and the computer 223).

As shown in FIG. 33, the multimedia computer 223 has a display 225, keyboard 227, and an audio transceiver unit 229. A computer memory 231 storing a computer program containing instructions can be inserted into the computer 223 via a slot 233. The audio transceiver unit 229 contains an encoder circuit for spread spectrum encoding and modulating a data signal to form a broadband signal at audio frequencies, a loudspeaker for outputting the broadband signal as an audio signal 243, a microphone for detecting an audio signal transmitted by the interactive toy 221 and a decoder circuit for extracting a data signal encoded in the audio signal detected by the microphone. The interactive toy 221 also has an audio transceiver unit 235 having an encoder circuit, a loudspeaker, a microphone and a decoder circuit identical to those in the audio transceiver unit 229. The toy 221 also has a user input device 237 having four buttons 239 which can be independently lit up.

In use, a user 241 inputs the computer memory 231 into the slot 233 of the computer 223 and runs the stored computer program which causes the computer 223 to generate a data signal indicating a sequence in which the buttons 239 of the user input device 237 of the interactive toy 221 are to be lit up. This data signal is sent to the audio transceiver 239 where it is encoded and output as an audio signal 243. The audio signal 243 output by the audio transceiver unit 229 of the computer 223 is detected and decoded by the audio transceiver unit 235 of the interactive toy 221. The buttons 239 of the user input device 237 are then lit up in the order indicated by the data signal encoded in the audio signal 243 transmitted from the computer 221 to the interactive toy 221.

When the buttons 239 have been lit up in the indicated order the user 241 attempts to press the buttons 239 in the same order as they were lit up. An audio signal 243 is then output by the audio transceiver unit 235 of the interactive toy 221 having encoded therein details of the order in which the user 241 pressed the buttons 239. This audio signal 243 is detected and decoded by the audio transceiver unit 229 of the computer 223 and the resulting data signal is processed by the computer 225. In this way the computer 225 is able to keep a record of the success rate of the user 241 and obtain statistical data as to how the user 241 improves over time and whether there are any particular sequences of buttons which the user finds difficult to reproduce.

FIG. 34 shows in more detail the audio transceiver unit 235 in the interactive toy 221. As shown, an audio signal received by the microphone 251 is converted into an electrical signal which is input to a filter 255 to remove unwanted frequencies. The filtered signal is then input to demodulator 257 and the output of the demodulator 257 is input to an analogue-to-digital converter (ADC) 259 which converts the demodulated signal into a digital signal. The digital signal output by the ADC 259 is then input to a correlator 261 which despreads the digital signal. In this embodiment the correlator 261 is a digital matched filter, as in the first to fourth embodiments, whose parameters are set by the output of a pseudo-noise code generator 263. The regenerated data signal output by the correlator 261 is input to a processor 265. A memory 267 is connected to the processor 265 for storing process instructions and to provide working memory.

The processor 265 determines from the regenerated data signal the sequence in which the buttons 239 are to be lit up and outputs a signal to the user input device 237 to light up the buttons 239 accordingly. When the user 241 subsequently attempts to repeat the sequence, the user input device 237 sends details of the buttons 239 pressed to the processor 265 which generates a data signal conveying this information. This data signal is then input to a multiplier 269 where it is multiplied by the pseudo-noise code output by the pseudo-noise code generator 263 in order to spread the power of the data signal over a broad range of frequencies. The spread signal output by the multiplier 269 is then input to a modulator 271 which centres the power of the main band of the spread signal to 5512.5 KHz. The modulated signal output by the modulator 271 is then input to the audio mixer 273 where it is combined in a simple adding operation to background music output by an audio source 275. The combined signal output by the audio mixer 273 is then converted into an audio signal by the loudspeaker 253.

The audio transceiver unit 229 connected to the computer 223 includes circuitry identical to that contained within the dashed block in FIG. 34 and a more detailed description of this transceiver unit 229 will therefore be omitted.

It will be appreciated that the background music could be generated by the audio transceiver unit 229 of the computer 223 with the encoded version of the data signal produced by the computer 223 being combined with the background music. However it is preferred that the background music be output by the interactive toy 221 as the interactive toy 221 will generally be nearer to the user 241 in use and therefore the power of the background music signal can be reduced.

The above embodiments have all been described in relation to an application in which an interactive toy 23 responds to a signal encoded in an audio track. However, the audio communication techniques described hereinbefore are broadly applicable to a wide range of applications further examples of which are given below.

In one application, as shown in FIG. 32, a conventional CD 205 has recorded thereon an audio track with a data signal encoded in the audio track. The audio track is output by a pair of speakers 207 of a music centre 209 in the form of audio signal 211 which is received by a microphone 213 which forms part of a lighting system 215. Incorporated in the lighting system 215 is a decoder like those described above for decoding the data signal encoded in the audio signal 211. This data signal conveys instructions to determine which of the lights 217a, 217b and/or 217c of the lighting system 215 are turned on at any one time. Therefore the lights 217 of the lighting system 215 can be made to react to the music in accordance with data programmed on the compact disc 205.

The audio communication techniques could also be used to distribute information to intelligent home appliances. For example, if a television programme about food is on the television or radio, recipes discussed could be encoded in the audio track and detected by a microphone of a computer which stores the recipe for future access by a user. Alternatively, news headlines or sports results could be encoded into the audio track of a television or radio signal to be detected by the computer and displayed on a screen either automatically or on command of a user. The audio communication system could also provide a distribution channel for paging information.

It will be appreciated that the term audio track refers to information which is intended to be reproduced as an audio signal by a loudspeaker in the audible range of frequencies, which typically spans from 20 Hz to 20,000 Hz. An audio signal is formed by pressure waves in the air that can be detected by an electro-acoustic transducer. Such pressure waves can alternatively be referred to as acoustic waves and audio signals can alternatively be referred to as acoustic signals.

As described previously, prior to an appliance converting the audio track to an audio signal, the audio track is conveyed to that appliance using any of a number of techniques, for example via a wireless broadcast, a cable network or a recording medium. It is envisaged that the transmission over the internet of audio tracks encoded with data using the audio communication techniques described hereinbefore will have many applications.

A particular advantage of encoding data onto an audio track is that the bandwidth required to transmit the audio track together with the data signal is no more than that required to transmit the audio track alone. The audio encoding techniques described hereinbefore could therefore be used for applications where the appliance which converts the audio track into an audio signal also decodes the data signal embedded in the audio track and reacts in some manner to the decoded data signal. For example, subtitles could be encoded in the audio track of a television signal, and a television set having a suitable decoder can decode the subtitles and display them on the screen. There is no need to remove the data signal from the audio track before converting the audio track into an audio signal because the data signal is not noticeable to a listener of the audio signal.

The present invention is not intended to be limited to the above described embodiments. Other modifications and embodiments would be apparent to those skilled in the art.

The invention claimed is:

1. A toy system comprising an encoder for encoding a data signal within an audio track to form a modified audio track, an electro-acoustic transducer for converting the modified audio track into a corresponding acoustic signal, and a toy responsive to the acoustic signal, wherein:

the encoder comprises:
(i) a first receiver operable to receive the data signal, the data signal defining a sequence of data symbols, the data signal having a data signal bandwidth, defined by a symbol duration of the data symbols, that is centered around a first frequency;
(ii) a spreader operable to spread the received data signal or a carrier signal modulated with the received data signal to form a spread signal having a signal bandwidth greater than the data signal bandwidth;
(iii) a modulator operable either:
  a) to use the data signal, before being spread by said spreader, to modulate at least one separate periodic carrier signal, whose period is smaller than the symbol duration of the data symbols, to form a modulated carrier signal such that, after spreading by the spreader, a main band of a power spectrum of the spread and modulated signal is centered around a second frequency that is different from the first frequency and that lies within an audible frequency band of 20 Hz and 20 kHz; or
  b) to use the spread signal to modulate at least one separate periodic carrier signal, whose period is smaller than the symbol duration of the data symbols, such that a main band of a power spectrum of the spread and modulated signal is centered around a second frequency that is different from the first frequency and that lies within an audible frequency band of 20 Hz and 20 kHz;
(iv) a second receiver operable to receive an audio track;
(v) a combiner operable to combine the spread and modulated signal with the audio track to generate a modified audio track; and
(vi) an output operable to output the modified audio track, and wherein the toy comprises: (i) an acousto-electric transducer operable to receive and convert the acoustic signal into a corresponding electrical signal; (ii) a decoder operable to de-spread and demodulate the electrical signal obtained from said acousto-electric transducer, in order to regenerate the data signal; and (iii) a responder responsive to the data signal.

2. A toy system according to claim 1, wherein the responder is operable to generate an output that is discernible to human beings.

3. A toy system according to claim 2, wherein the responder is operable to cause the toy to output an acoustic signal determined using the data signal.

4. A toy system according to claim 3, wherein the responder comprises a processor operable to select one of a plurality of sound files stored in a memory in dependence upon a content of the data signal, and to output the selected sound file via an electro-acoustic transducer.

5. A toy system according to claim 4, wherein the memory is detachable.

6. A toy system according to claim 2, wherein the responder is arranged to cause the toy to display a visual signal determined using the data signal.

7. A toy system according to claim 2, wherein the responder is operable to cause a movement of the toy in dependence upon a content of the data signal.

8. A toy system according to claim 2, wherein the responder is operable to cause a movement of part of the toy relative to the rest of the toy in dependence upon a content of the data signal.

9. A toy system according to claim 1, wherein the toy further comprises:
a generator operable to generate a data signal;
a spreader operable to spread the generated data signal to form a spread signal; and
an electro-acoustic transducer operable to receive and convert the spread signal into an acoustic signal.

10. A toy system according to claim 1, wherein the received data signal is a baseband signal such that the first frequency is 0 Hz.

11. A toy system according to claim 1, wherein the encoder comprises an oscillator operable to generate the at least one periodic carrier signal.

12. A toy system according to claim 1, wherein the at least one carrier signal is a sinusoid signal.

13. A toy system according to claim 1, wherein the spreader comprises a first pseudo-noise code generator operable to generate a first pseudo-noise code comprising a sequence of chips, and is operable to perform direct sequence spread spectrum encoding using the first pseudo-noise code.

14. A toy system according to claim 13, wherein the first pseudo-noise code generator is operable to generate a 12 bit code having 4095 chips.

15. A toy system according to claim 13, wherein the spreader is operable to combine each data element of the data signal with a part of the first pseudo-noise code.

16. A toy system according to claim 15, wherein the spreader is arranged to multiply each data element of the data signal by a sequence of two hundred and fifty-six chips of the first pseudo-noise code.

17. A toy system according to claim 13, wherein the spreader further comprises a second pseudo-noise code generator operable to generate a second pseudo-noise code which is different to the first pseudo-noise code,
and the spreader being arranged to combine each data element of the data signal with a chip sequence from either the first pseudo-noise code or the second pseudo-noise code in dependence upon the value of the data element.

18. A toy system according to claim 17, wherein the second pseudo-noise code generator is operable to generate a second pseudo-noise code orthogonal to the first pseudo-noise code.

19. A toy system according to claim 1, wherein the encoder further comprises a scaler operable to scale the spread and modulated signal.

20. A toy system according to claim 19, wherein the decoder further comprises a de-scaler operable to remove the scaling applied by the scaler.

21. A toy system according to claim 19, wherein the scaler is operable to perform a frequency dependent scaling.

22. A toy system according to claim 21, wherein the scaler is operable to increase the proportion of the energy at lower frequencies.

23. A toy system according to claim 22, wherein the scaler is arranged to apply a frequency-dependent scaling function having a frequency dependence between $1/f$ and $1/f^2$, where f is the frequency.

24. A toy system according to claim 22, wherein the scaling function is approximately inverse to the sensitivity of a human ear.

25. A toy system according to claim 1, wherein the encoder further comprises a scaler operable to scale the spread signal and a power monitor operable to output a signal indicative of the power in the audio track to the scaler, and wherein the scaler is operable to vary the applied scaling in dependence upon the power signal output by the power monitor.

26. A toy system according to claim 25, wherein the scaler is operable to adjust the power in the spread and modulated signal to be a fixed amount below the power in the audio track, unless the power of the audio track is below a threshold in which case the power of the spread and modulated signal is set at a predetermined level.

27. A toy system according to claim 1, wherein the encoder further comprises a scaler operable to scale the spread and modulated signal and a psycho-acoustic analysis system for determining theoretical minimum audible sound levels in the presence of the audio track, and wherein the scaler is operable to scale the spread signal in accordance with the determined theoretical minimum audible sound levels.

28. A toy system according to claim 27, wherein the scaler is operable to scale the power of the spread and modulated signal to be at or above the determined minimum audible sound level.

29. A toy system according to claim 28, wherein the scaler is operable to scale the power of the spread and modulated signal to be a predetermined amount above the theoretical minimum audible level.

30. A toy system according to claim 27, wherein the psycho-acoustic analysis system is operable to analyze the audio track in segments whose duration corresponds to the duration of an integer number of data elements of the data signal, and wherein the encoder is operable: (1) to scale a portion of the spread and modulated signal corresponding to one data element of the data signal in accordance with the minimum audible sound level calculated for a segment of the audio track; and (ii) to subsequently combine said portion of the spread and modulated signal with said segment of the audio track.

31. A toy system according to claim 30, wherein the decoder does not include a de-scaling unit.

32. A toy system according to claim 27, wherein the psycho acoustic analysis unit is operable to generate frequency-dependent scaling factors corresponding to a segment of the audio track in accordance with the frequency spectrum of that segment.

33. A toy system according to claim 13, wherein said decoder is operable to demodulate the electrical signal,
wherein the decoder comprises a second pseudo-noise code generator operable to generate a second pseudo-noise code identical to the first pseudo-noise code, and wherein the decoder is operable to synchronously multiply the demodulated signal by the second pseudo-noise code to form a de-spread signal.

34. A toy system according to claim 13, wherein the decoder of the toy comprises:
a second pseudo-noise code generator operable to generate a second pseudo-noise code identical to the first pseudo-noise code, and wherein the decoder is operable to synchronously multiply the electrical signal by the second pseudo-noise code to form a de-spread signal; and
a demodulator operable to demodulate the de-spread signal to form a demodulated signal.

35. A toy system according to claim 33, wherein the decoder comprises a rake receiver having a plurality of prongs, and the decoder is operable to introduce different time delays between the electrical signal and the second pseudo-noise code in each prong of the rake receiver, in order to de-spread different components of the electrical signal.

36. A toy system according to claim 33, wherein the decoder further comprises a synchronization circuit operable to synchronize the second pseudo-noise code with a code sequence conveyed by the electrical signal.

37. A toy system according to claim 36, wherein the synchronization circuit comprises:
a correlator operable to generate a time-varying output dependent on the similarity of a chip sequence conveyed by the electrical signal and a predetermined chip sequence; and
a normalization circuit operable to scale the time-varying output of the correlator by a normalization factor determined from the average value of the time-varying output over a predetermined period of time.

38. A toy system according to claim 37, wherein the normalization circuit comprises a calculator operable to calculate a running average of the time-varying output over the predetermined period of time.

39. A toy system according to claim 36, wherein the synchronization circuit comprises:
a correlator operable to generate a time-varying output by correlating a chip sequence conveyed by the electrical signal and a predetermined chip sequence;
a cross-correlator operable to cross-correlate the output of the correlator over a first time period with the output of the correlator over a second time period; and
a determiner operable to determine a frequency offset between the frequency at which the second pseudo-noise code generator generates the second pseudo-noise code and the frequency of the code sequence conveyed by the electrical signal from the output of the cross-correlator.

40. A toy system according to claim 36, wherein the synchronization circuit comprises:
a correlator operable to generate a time-varying output by correlating a chip sequence conveyed by the electrical signal and a predetermined chip sequence;
a cross-correlator operable to cross-correlate the output of the correlator over a first time period with the output of the correlator over a second time period; and
a determiner operable to determine the difference between the chip rate of the predetermined chip sequence and the chip rate of the chip sequence conveyed by the electrical signal from the output of the cross-correlator.

41. A toy system according to claim 39, further comprising a normalization circuit operable to scale the time-varying output of the correlator by a normalization factor determined from the average value of the time-varying output over a predetermined period of time.

42. A toy system according to claim 41, wherein the normalization circuit comprises a running average calculator operable to calculate a running average of the time-varying output over the predetermined period of time.

43. A toy system according to claim 36, wherein the synchronization circuit comprises:
a plurality of correlators, each correlator arranged to generate a time-varying output determined by correlating a chip sequence conveyed by the electrical signal and a respective predetermined chip sequence; and
a controller operable to control the second pseudo-noise code generator in accordance with the outputs of the plurality of correlators,
wherein the respective predetermined chip sequences have the same chip rate.

44. A toy system according to claim 43, wherein the plurality of correlators are cascaded in series.

45. A toy system according to claim 43, wherein the plurality of correlators are connected in parallel.

46. A toy system according to claim 43, further comprising a plurality of normalization circuits, each normalization circuit being operable to scale the time-varying output of a respective one of the plurality of correlators by a normalization factor determined from the average of the time-varying output of that correlator over a predetermined period of time.

47. A toy system according to claim 46, wherein the normalization circuit comprises a running average calculator operable to calculate a running average of the time-varying output over the predetermined period of time.

48. A toy system according to claim 36, wherein the synchronization circuit further comprises:
- a plurality of cross-correlators, each cross-correlator being arranged to cross-correlate the output of a respective one of the plurality of correlators over a first time period with the output of that respective correlator over a second time period;
- an adder operable to add the outputs of each of the cross-correlators; and
- a determiner operable to determine a frequency offset between the frequency at which the second pseudo-noise code generator generates the second pseudo-noise code and the frequency of the spreading code in the electrical signal from the output of the adder.

49. A toy system according to claim 37, wherein the correlator is formed by a matched filter.

50. A toy system according to claim 1, wherein the encoder forms part of a television broadcast system, and the electro-acoustic transducer is formed by a loudspeaker of a television set.

51. A toy system according to claim 1, wherein the audio track is the audio track of a television programme, and the data signal is operable to enable the toy to interact with the television programme.

52. A toy system according to claim 1, in which the modified audio track is recorded on a recording medium, and the toy system further comprises a reproducing apparatus, including the electro-acoustic transducer, for reproducing the modified audio track stored on the recording medium.

53. A toy system according to claim 52, wherein the recording medium is a compact disc.

54. A toy system according to claim 52, wherein the recording medium is a video cassette.

55. A toy system according to claim 34, wherein the decoder comprises a rake receiver having a plurality of prongs, and the decoder is operable to introduce different time delays between the electrical signal and the second pseudo-noise code in each prong of the rake receiver, in order to de-spread different components of the electrical signal.

56. A toy system according to claim 40, further comprising a normalization circuit operable to scale the time-varying output of the correlator by a normalization factor determined from the average value of the time-varying output over a predetermined period of time.

57. A method of controlling a toy, the method comprising the steps of:
- receiving, at a control center, a data signal defining a sequence of data symbols, the data signal having a data signal bandwidth, defined by a symbol duration of said data symbols, that is centered around a first frequency;
- spreading the received data signal or a carrier signal modulated with the received data signal to form a spread signal having a signal bandwidth greater than said data signal bandwidth;
- either:
  - a) using the data signal before being spread in said spreading step to modulate at least one separate periodic carrier signal, having a period which is smaller than said symbol duration, to form a modulated carrier signal such that, after spreading in said spreading step, a main band of a power spectrum of the spread and modulated signal is centered around a second frequency that is different from said first frequency and that lies within an audible frequency band of 20 Hz and 20 kHz; or
  - b) using the data signal after being spread in said spreading step to modulate at least one separate periodic carrier signal, having a period which is smaller than said symbol duration, such that a main band of a power spectrum of the spread and modulated signal is centered around a second frequency that is different from said first frequency and that lies within an audible frequency band of 20 Hz and 20 kHz;
- combining the spread and modulated signal with an audio track to form a modified audio track;
- transmitting the modified audio track to an electro-acoustic transducer in the vicinity of the toy;
- converting the modified audio track into an acoustic signal at the electro-acoustic transducer;
- receiving the acoustic signal at the toy;
- converting the acoustic signal received by the toy into an electrical signal;
- de-spreading and demodulating the electrical signal obtained by converting the acoustic signal to generate a de-spread signal;
- regenerating the data signal from the demodulated and de-spread signal; and
- controlling the toy in accordance with a content of the data signal.

* * * * *

UNITED STATES PATENT AND TRADEMARK OFFICE
CERTIFICATE OF CORRECTION

PATENT NO.         : 7,505,823 B1
APPLICATION NO. : 09/856734
DATED                 : March 17, 2009
INVENTOR(S)       : Bartlett et al.

Page 1 of 1

It is certified that error appears in the above-identified patent and that said Letters Patent is hereby corrected as shown below:

On the title page item (57) ABSTRACT,

Delete the ABSTRACT in its entirety and insert the correct abstract as follows:

--A toy system is described in which a data signal is encoded using spread spectrum technology to form a spread signal which is combined with an audio track to form a modified audio track. The modified audio track is then transmitted as an acoustic signal to a toy having an electro-acoustic transducer for converting the acoustic signal into an electrical signal which is then despread in order to regenerate the data signal, and the toy responds to the data signal. By using spread spectrum technology to spread the data signal over a wide frequency range, the spread signal in the modified audio track can be made virtually inaudible to a listener. The techniques described have relevance to acoustic communication systems other than toy systems.--

Signed and Sealed this

Ninth Day of June, 2009

JOHN DOLL
*Acting Director of the United States Patent and Trademark Office*